United States Patent
Dickinson et al.

(10) Patent No.: US 9,759,451 B2
(45) Date of Patent: Sep. 12, 2017

(54) RECIRCULATING BATH

(71) Applicant: Thermo Fisher Scientific (Asheville) LLC, Asheville, NC (US)

(72) Inventors: Randall D. Dickinson, Kennebunk, ME (US); Mark J. Estrella, Scarborough, ME (US); Nathan Norman Lang, Rochester, NH (US)

(73) Assignee: Thermo Fisher Scientific (Asheville) LLC, Asheville, NC (US)

( * ) Notice: Subject to any disclaimer, the term of this patent is extended or adjusted under 35 U.S.C. 154(b) by 191 days.

(21) Appl. No.: 14/489,209

(22) Filed: Sep. 17, 2014

(65) Prior Publication Data

US 2015/0144206 A1    May 28, 2015

Related U.S. Application Data

(60) Provisional application No. 61/907,575, filed on Nov. 22, 2013.

(51) Int. Cl.
  *F24H 9/20* (2006.01)
  *B01L 7/02* (2006.01)
  (Continued)

(52) U.S. Cl.
  CPC .............. *F24H 9/2021* (2013.01); *B01L 7/02* (2013.01); *F24H 9/2028* (2013.01); *F25D 17/02* (2013.01);
  (Continued)

(58) Field of Classification Search
  CPC ........ F24H 9/2021; F24H 9/2028; F24H 4/02; F24H 2250/06; F24H 2250/02;
  (Continued)

(56) References Cited

U.S. PATENT DOCUMENTS 2,282,164 A * 5/1942 Buswell .................... G07F 5/18
                                                              194/239
3,301,318 A    1/1967 Haake
                (Continued)

FOREIGN PATENT DOCUMENTS

WO          9107550 A1     5/1991
WO       2013061043 A2     5/2013
WO       2013166910 A1    11/2013

OTHER PUBLICATIONS

European Patent Office, Extended European Search Report, Application No. EP14193761, mailed Jul. 17, 2015 (12 pages).
(Continued)

*Primary Examiner* — Emmanuel Duke
(74) *Attorney, Agent, or Firm* — Wood Herron & Evans LLP

(57) ABSTRACT

A recirculating bath includes a reservoir for receiving a working liquid, a recirculating pump, and at least one thermal element. The recirculating pump and thermal element are located externally to the reservoir so that the reservoir has an unobstructed working space. The thermal element may be thermally coupled to the working liquid through an interior surface of the reservoir, or the working liquid may be circulated over the thermal element by the recirculating pump in a chamber external to the reservoir. The recirculating bath may also include a lid that provides access to the reservoir by pivoting on a latching hinge. When open, the lid may provide a working surface adjacent to the reservoir. The lid may also include a selector that unlatches the hinge so that the lid can be removed. The recirculating pump may be fluidically coupled to the reservoir via a manifold.

23 Claims, 18 Drawing Sheets

(51) Int. Cl.
  *F25D 17/02* (2006.01)
  *F25D 29/00* (2006.01)
  *F25D 31/00* (2006.01)
  *F24H 1/00* (2006.01)
  *F24H 4/02* (2006.01)

(52) U.S. Cl.
  CPC ........... *F25D 29/00* (2013.01); *F25D 31/005* (2013.01); *B01L 2200/143* (2013.01); *B01L 2300/043* (2013.01); *B01L 2300/1822* (2013.01); *B01L 2300/1827* (2013.01); *B01L 2300/1844* (2013.01); *B01L 2400/0475* (2013.01); *F24H 1/0018* (2013.01); *F24H 1/0081* (2013.01); *F24H 4/02* (2013.01); *F24H 9/2007* (2013.01); *F24H 2250/02* (2013.01); *F24H 2250/06* (2013.01); *Y02B 30/12* (2013.01); *Y10T 137/6416* (2015.04); *Y10T 137/85954* (2015.04); *Y10T 137/86035* (2015.04)

(58) Field of Classification Search
  CPC ...... F24H 1/0081; F25D 31/005; F25D 17/02; B01L 7/02; Y02B 30/12
  USPC .......................................................... 62/202
  See application file for complete search history.

(56) References Cited

U.S. PATENT DOCUMENTS

| | | | | |
|---|---|---|---|---|
| 3,370,454 A | * | 2/1968 | Flores | G01K 15/00 165/108 |
| 3,844,338 A | * | 10/1974 | Hilgemann | F24F 5/0071 165/222 |
| 3,889,419 A | | 6/1975 | Maleck | |
| 3,985,511 A | * | 10/1976 | Betts | B01L 7/02 126/374.1 |
| 4,566,287 A | * | 1/1986 | Schmidt | B67D 1/0021 141/174 |
| 4,955,402 A | | 9/1990 | Miranda | |
| 5,014,737 A | * | 5/1991 | Berman | B01J 19/0073 137/334 |
| 5,054,519 A | * | 10/1991 | Berman | B05C 3/02 118/429 |
| 5,056,552 A | * | 10/1991 | Berman | H01L 21/67023 137/334 |
| 5,222,792 A | | 6/1993 | Kai et al. | |
| 5,279,446 A | * | 1/1994 | Cook | G05D 23/1919 222/146.6 |
| 5,560,222 A | * | 10/1996 | Perron | F24F 1/022 165/61 |
| 5,675,934 A | | 10/1997 | Park | |
| 6,000,771 A | | 12/1999 | Wissinger et al. | |
| 6,003,595 A | | 12/1999 | Watanabe | |
| 6,324,857 B1 | | 12/2001 | Hofling | |
| 6,438,989 B1 | * | 8/2002 | Wolski | B67D 1/0864 62/299 |
| 7,686,285 B2 | | 3/2010 | Murray et al. | |
| 8,220,881 B2 | | 7/2012 | Keith | |
| 2005/0176140 A1 | * | 8/2005 | Benedict | C12M 23/58 435/366 |
| 2005/0205007 A1 | * | 9/2005 | Rolfson | G03F 7/168 118/58 |
| 2007/0012678 A1 | * | 1/2007 | Authier | F24D 19/1057 219/219 |
| 2007/0158250 A1 | | 7/2007 | Dickinson et al. | |
| 2008/0256972 A1 | * | 10/2008 | Knoll | B67D 1/0057 62/376 |
| 2009/0040866 A1 | | 2/2009 | Rollin, III et al. | |
| 2011/0240318 A1 | * | 10/2011 | Bradfield | A62C 31/05 169/46 |
| 2012/0263608 A1 | | 10/2012 | Dickinson et al. | |

OTHER PUBLICATIONS

Xutemp Temptech Co., Ltd., Dr. Temperature for Lab & Process, Prime Edition, Copyright 2013-2016 (12 pages).
Espacenet, English Machine Translation of Abstract, WO2013166910A1, published Nov. 14, 2013, retrieved from http://worldwide.espacenet.com on May 26, 2015 (2 pages).
European Patent Office, Partial European Search Report, Application No. EP14193761, mailed Mar. 24, 2015 (4 pages).

\* cited by examiner

RECIRCULATING BATH

CROSS-REFERENCE TO RELATED APPLICATIONS

The present application claims the filing benefit of U.S. Provisional Application Ser. No. 61/907,575, filed Nov. 22, 2013, the disclosure of which is hereby incorporated herein by reference in its entirety.

FIELD OF THE INVENTION

The present invention relates generally to recirculating baths and, more particularly, to recirculating baths having an improved work area for use in a laboratory environment.

BACKGROUND OF THE INVENTION

Recirculating baths are used in laboratory settings for providing a controlled temperature working liquid, such as water, in a reservoir. The end user may utilize the recirculating bath by placing their application in the reservoir or by recirculating the working liquid between the reservoir and an external application. Conventional recirculating bath applications include placing beakers or other containers in the bath reservoir, or work area, and controlling the temperature of an external jacketed vessel. To control the temperature of the working liquid, the recirculating bath moves the liquid past heating or cooling elements located in the bath reservoir so as to achieve a uniform desired temperature.

Conventional recirculating baths include a base unit and a head unit. The base unit includes the reservoir and a cooling unit having a cooling element located in the reservoir. The cooling element enables the cooling unit to remove heat from the working liquid. A work area cover, or lid, may be provided on top of the base unit that provides access to the work area of the reservoir. Conventional head units include an immersion pump for recirculating the working liquid, and an immersion heater for providing heat to the working liquid. The head unit also includes a human machine interface (HMI) that allows the user to program the head unit to maintain the working liquid at a desired temperature, and to otherwise operate the recirculating bath.

In operation, the head unit sits on top of the base unit so that the immersion heater and immersion pump project downward into the reservoir through an opening in the top of the base unit. This orientation locates the heating element of the immersion heater and the immersion pump in the working liquid. The head unit may thereby control the temperature of and circulate the working liquid. The HMI of the head unit projects upward from the base unit to provide access to the user and enable the user to control operation of the recirculating bath.

Conventional head units take up space on the top of the base unit and restrict access to the reservoir. The immersion pump, immersion heater, and cooling elements also occupy space in the bath reservoir, thereby restricting the size and utility of the reservoir work area. The heating and cooling elements may also over-heat or over-cool samples that inadvertently come into contact with the elements, are difficult to keep clean, and can cross-contaminate working liquids in different base units or between different lab applications.

Thus, there is a need for improved recirculating baths that have increased utility and reduced maintenance.

SUMMARY OF THE INVENTION

The present invention overcomes the foregoing problems and other shortcomings, drawbacks, and challenges of recirculating baths. While the present invention will be described in connection with certain embodiments, it will be understood that the present invention is not limited to these embodiments. To the contrary, the present invention includes all alternatives, modifications, and equivalents as may be included within the spirit and scope of the present invention.

In one embodiment of the present invention, a recirculating bath is provided. The recirculating bath includes a reservoir having an interior surface that defines a first space configured to receive a working liquid. A thermal element located externally to the first space may be thermally coupled to the working liquid to transfer heat between the working liquid and the thermal element. A recirculating pump external to the first space may be fluidically coupled to the first space to circulate the working liquid.

In another embodiment of the present invention, the thermal element may be thermally coupled to the working liquid by the interior surface of the reservoir. The thermal element may also be an evaporator coil.

In another embodiment of the present invention, the recirculating bath may further include a chamber fluidically coupled to the first space by the recirculating pump so that working liquid circulated through the reservoir by the pump passes through the chamber. The chamber may be external to the reservoir, and may enclose at least a portion of the thermal element. The thermal element may also be a heating element.

In another embodiment of the present invention, the recirculating bath may further include a cooling unit including a compressor and an evaporator, and the thermal element may comprise at least a portion of the evaporator. The reservoir may include a first shell and a second shell. The second shell may be disposed within the first shell to define a second space between the first and second shells, and at least a portion of the evaporator coil may be located in the second space.

In another embodiment of the present invention, the recirculating bath may further include a controller operatively coupled to the thermal element and recirculating pump, and a human machine interface operatively coupled to the controller. The human machine interface may be configured to transmit instructions received from the user to the controller and display information received from the controller to the user. The recirculating bath may also include a housing configured to accommodate the reservoir, thermal element, recirculating pump, controller, and human machine interface. The housing may include a top surface that provides access to the first space that is unobstructed by the thermal element, recirculating pump, controller, or human machine interface.

In another embodiment of the present invention, the recirculating bath may include a lid that provides access to at least a portion of the first space. The lid may be selectively coupled to the recirculating bath by a hinge having a latched state that pivotally couples the lid to the recirculating bath, and an unlatched state that decouples the lid from the recirculating bath. The lid may also be configured to have an open position that provides a horizontal working surface adjacent to an opening in the reservoir.

In another embodiment of the present invention, a recirculating bath includes a reservoir having an interior surface that defines a space configured to receive a working liquid, and a recirculating pump configured to circulate the working liquid through the space. The recirculating bath may further include a manifold comprising an inlet configured to receive the working liquid from the recirculating pump, an outlet configured to discharge the working liquid into the first space, and a hollow body fluidically coupling the inlet to the first outlet.

In another embodiment of the present invention, the outlet of the manifold comprises a plurality of apertures in the hollow body, each aperture configured to discharge a portion of the working liquid received by the inlet into the space.

BRIEF DESCRIPTION OF THE DRAWINGS

The accompanying drawings, which are incorporated in and constitute a part of this specification, illustrate embodiments of the present invention and, together with a general description of the present invention given above, and the detailed description of the present invention given below, serve to explain the principles of the present invention.

DETAILED DESCRIPTION OF THE PREFERRED EMBODIMENT

Embodiments of the present invention provide a recirculating bath for laboratory applications having an unobstructed top and reservoir work area. To this end, heating and cooling elements and the recirculating pump are located externally to the reservoir. Embodiments of the present invention thereby offer a larger work area in the reservoir, are easier to clean, and allow the recirculating bath to work with lower working liquid levels than conventional baths lacking these features. Eliminating the need for a head unit may also provide an unobstructed top surface on the recirculating bath, enabling implementation of a hinged removable lid that provides a staging area next to the reservoir.

Figure 1:
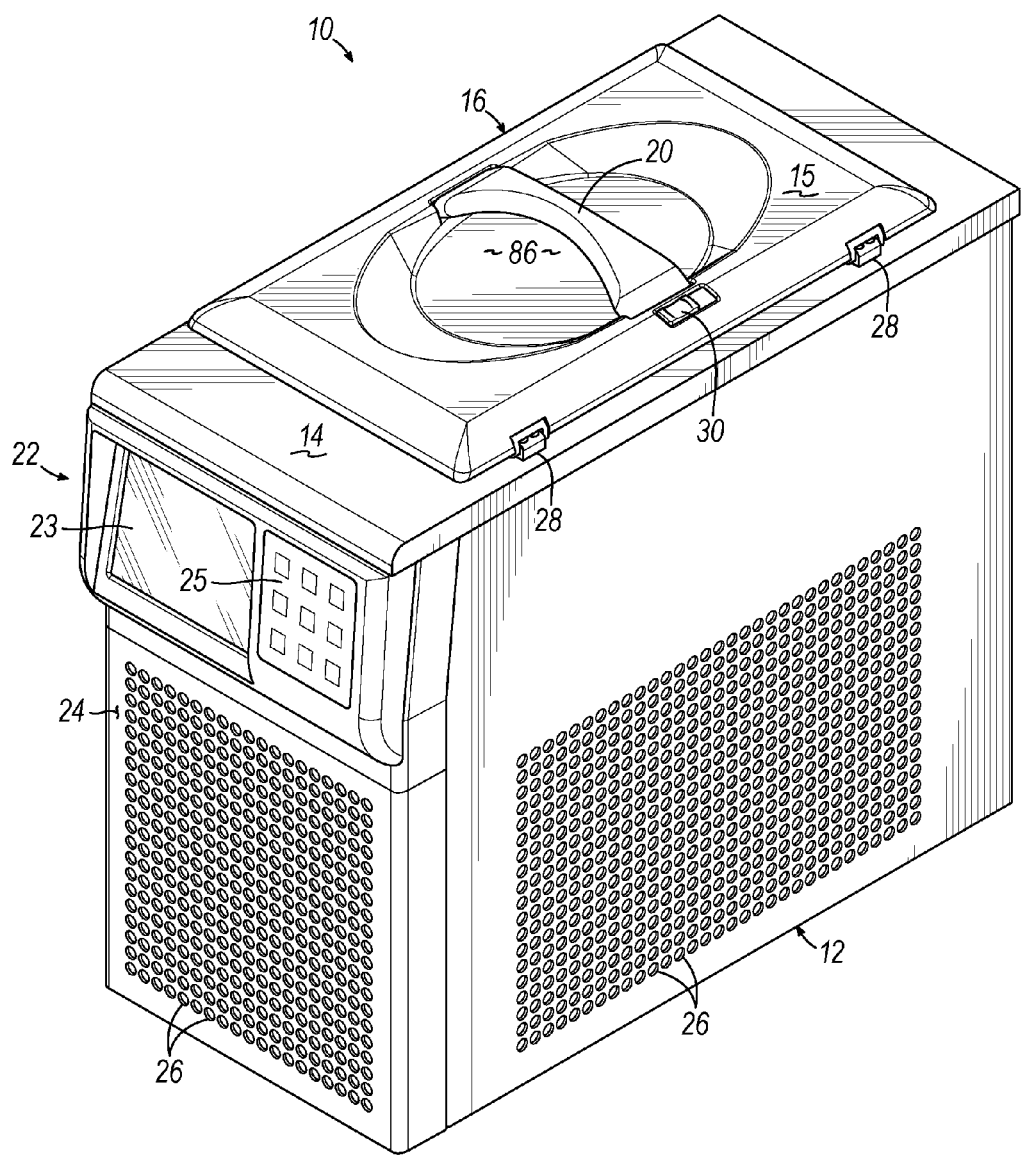
FIG. 1 is a perspective view of a recirculating bath, including a housing and a lid covering a work area of a reservoir in accordance with an embodiment of the present invention.

Referring now to FIG. 1, and in accordance with an embodiment of the present invention, a recirculating bath 10 includes a housing 12 having a top surface 14. The top surface 14 includes a work area cover, or lid 16, that provides access to a work area, such as a reservoir 18 (FIG. 2) of recirculating bath 10, which is described in greater detail below. The lid 16 may include a top surface 15 and a gripping portion or handle 20 to facilitate opening and/or removing the lid 16 from the recirculating bath 10. The handle 20 may be thermally isolated from the rest of the lid 16 to prevent the handle 20 from becoming too hot or too cold to be handled by the user. The recirculating bath 10 may further include a human machine interface (HMI) 22 on a front side 24 of the housing 12 having a display 23. In a preferred embodiment, the display 23 may comprise a touch screen that enables the user to enter data and control operation of the recirculating bath 10 in a known manner. Embodiments of the present invention may also include other suitable data entry devices, such as a keypad 25. Embodiments of the present invention are therefore not limited to recirculating baths 10 that include a touchscreen. The housing 12 may also include a plurality of openings 26 that allows air to reach components enclosed by the housing 12.

The lid 16 may further include a plurality of hinges 28 that couple the lid 16 to the housing 12. A selector 30 having a "latched" position and an "unlatched" position may be located on the lid 16 and coupled to the hinges 28. The selector 30 may enable the user to select whether the hinges are latched or unlatched. In the latched condition, the hinges 28 may be configured to locate the lid 16 in a pivoting relationship with the housing 12 so that the lid 16 may be opened by pivoting the lid 16 about an axis defined by the hinges 28. In the unlatched position, the hinges 28 may be configured to release the lid 16 from the housing 12 so that the lid 16 can be removed.

Figure 2:
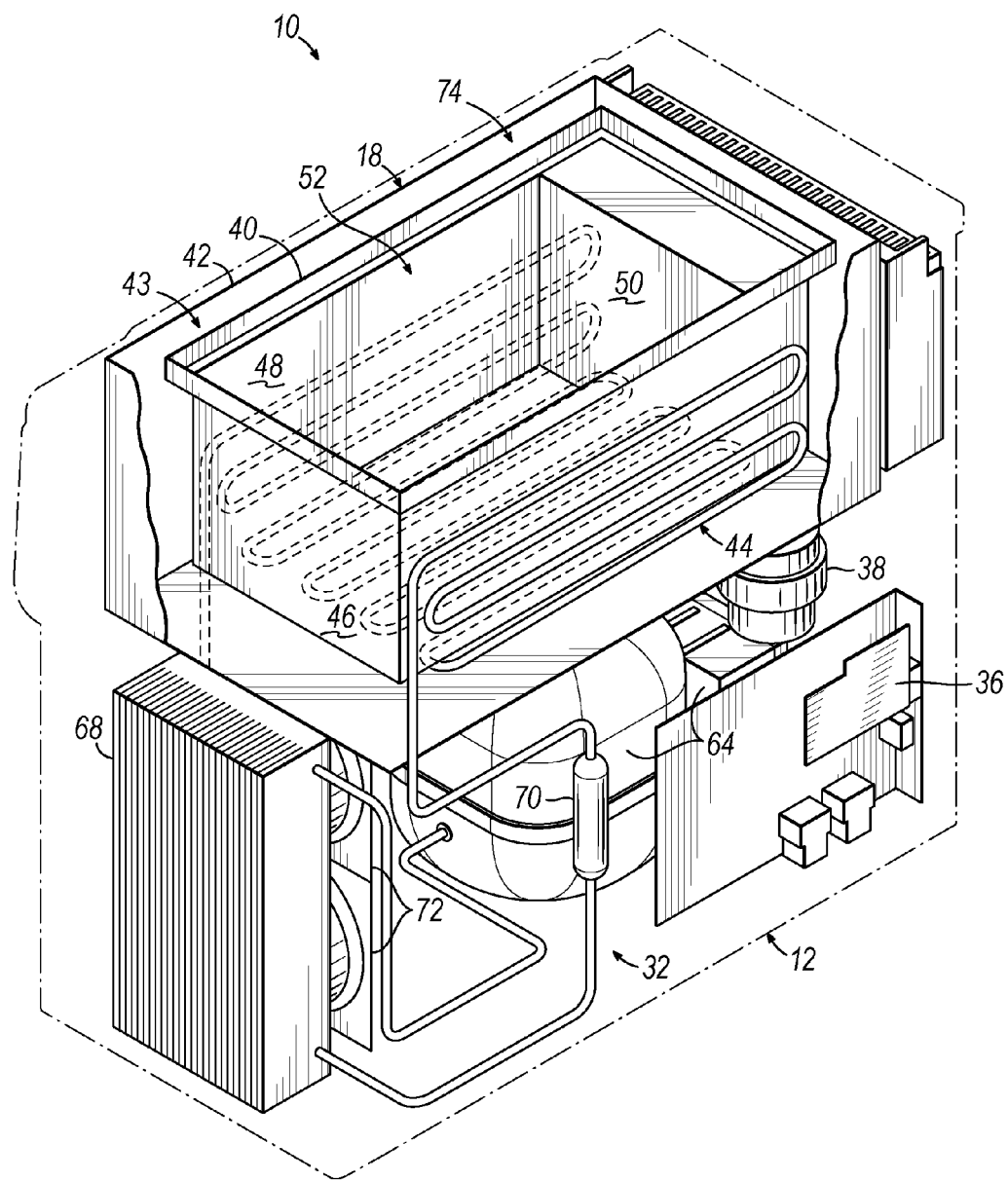
FIG. 2 is a perspective view of the recirculating bath of FIG. 1 with the housing made transparent to show details of the reservoir and a cooling unit of the recirculating bath in accordance with an embodiment of the present invention.
Figure 3:
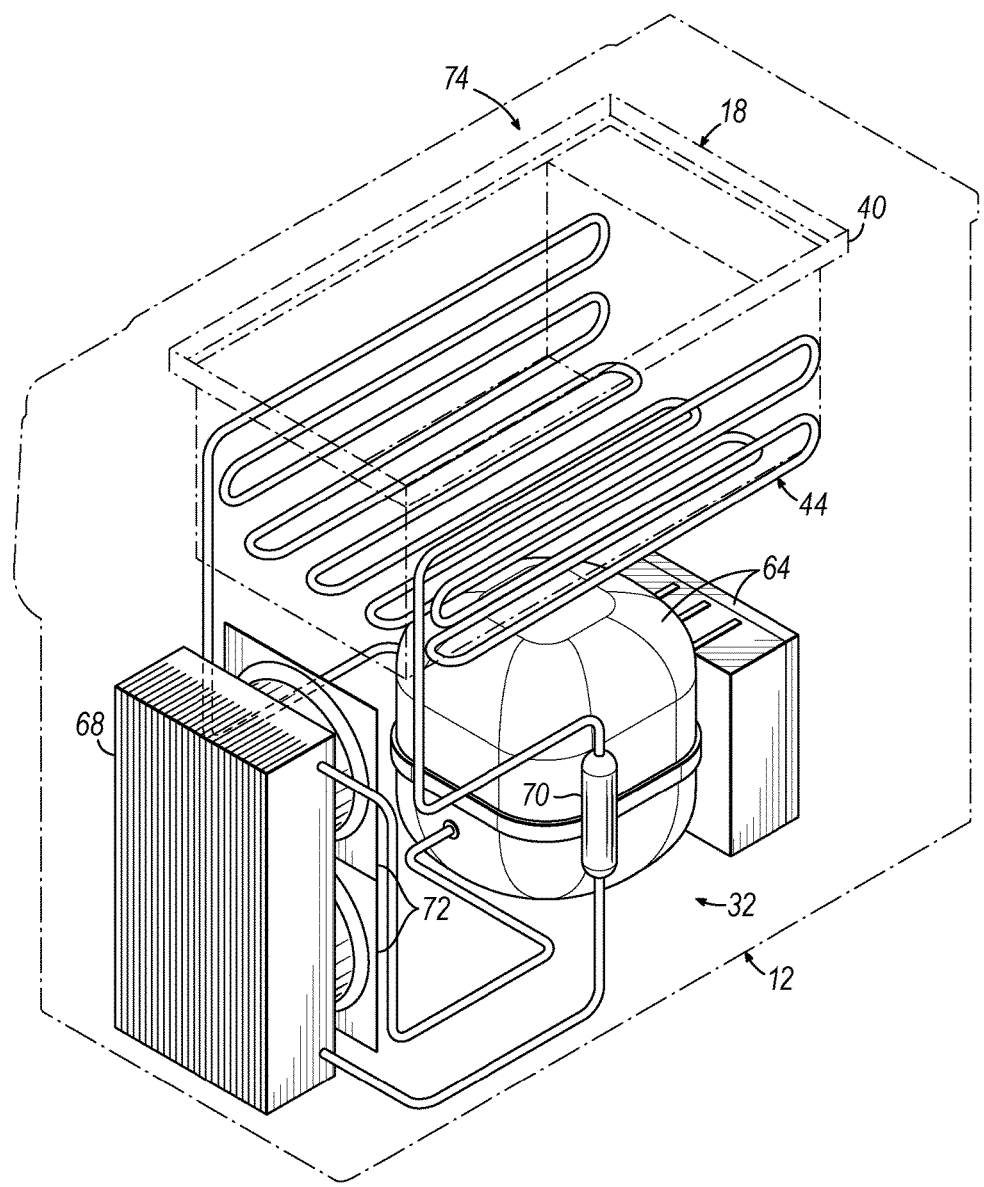
FIG. 3 is a perspective view of the recirculating bath of FIG. 2 with the reservoir depicted by ghost lines to show additional details of the cooling unit in accordance with an embodiment of the present invention.
Figure 4:
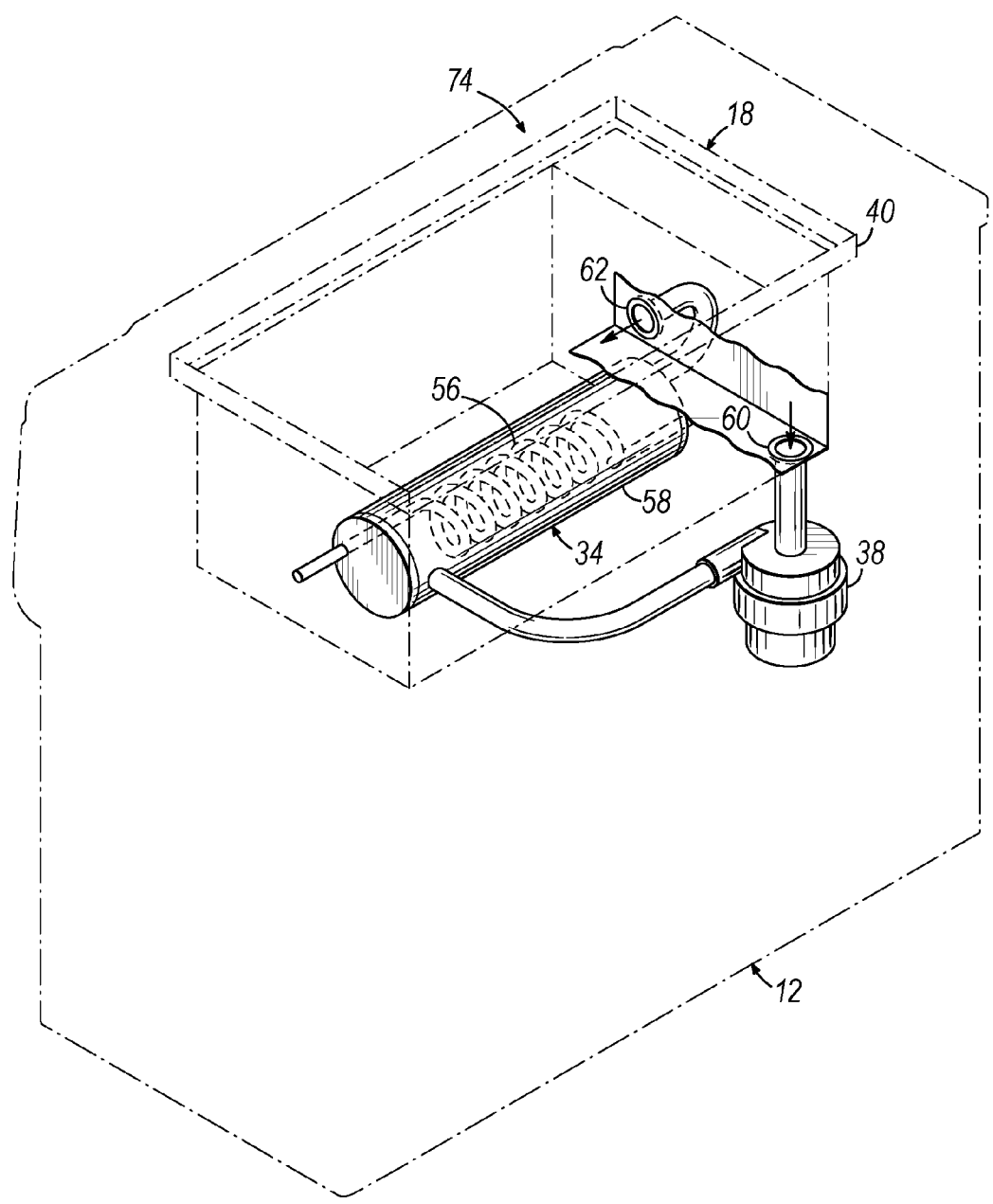
FIG. 4 is a perspective view of the recirculating bath in FIG. 3 with the cooling unit removed to show details of a heater and a recirculating pump in accordance with an embodiment of the present invention.

Referring now to FIGS. 2-4, the recirculating bath 10 is illustrated in a perspective view with the housing 12 indicated by ghost lines to show the reservoir 18, a cooling unit 32, a heater 34 (FIG. 4), a controller 36, and a recirculating pump 38. The reservoir 18 may include an inner shell 40 and an outer shell 42. The inner and outer shells 40, 42 may be comprised of stainless steel, aluminum, a plated or coated metal, plastic, or any other suitable material. The inner and outer shells 40, 42 may define a space 43 between the shells 40, 42 that enclose a thermal element, such as an evaporator coil 44. The outer shell 42 may also protect and retain insulation (not shown) provided in the space 43. For example, expanded foam may be introduced in the space 43 to reduce the transfer of heat between the inner shell 40 and the outer shell 42. In an alternative embodiment of the present invention, the thermal element may be embedded in the inner shell 40, or affixed to an outer surface 46 of the inner shell 40, in which case the outer shell 42 may be omitted. The inner shell 40 may also include one or more channels that provide a space for, or form a part of, the evaporator coil 44.

Figure 5:
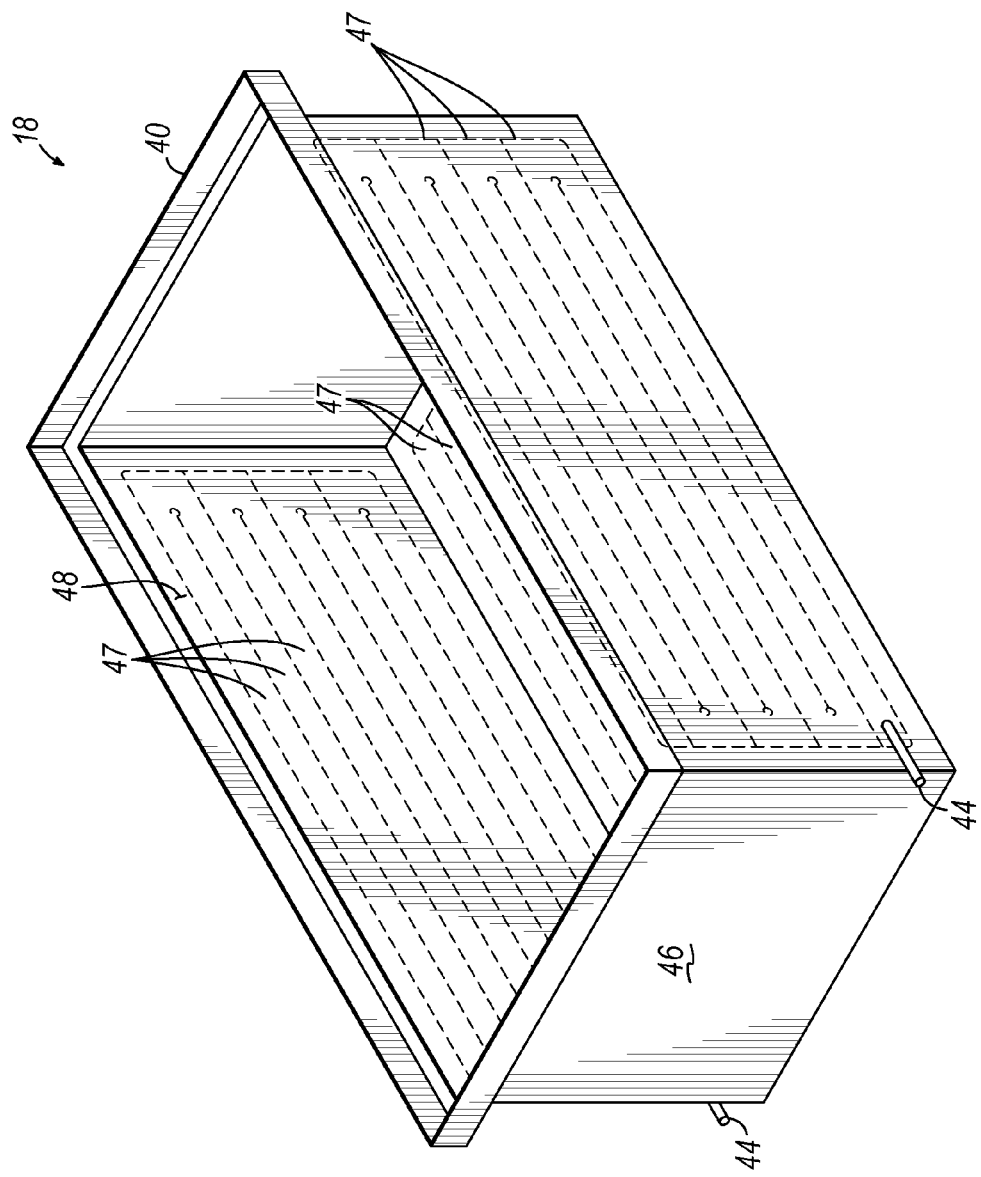
FIG. 5 is a perspective view of a reservoir in accordance with an embodiment of the present invention showing details of an inner shell of the reservoir.

Referring now to FIG. 5, an exemplary embodiment of the reservoir 18 is illustrated in which the inner shell 40 includes a channel 47. The channel 47 may, for example, be hydraulically or mechanically formed in the inner shell 40. The channel 47 may create a space for the evaporator coil 44, or may form a part of the evaporator coil 44. For embodiments in which the channel 47 provides a space for the evaporator coil, the evaporator coil 44 may be located in the channel 47 such that the evaporator coil 44 is in thermal contact with the inner shell 40. In an alternative embodiment, the channel 47 may form a part or substantially all of the evaporator coil 44, in which case a suitable refrigerant, such as a hydrofluorocarbon (HFC), may be provided directly to the channel 47.

In an embodiment of the present invention, the channels 47 may produce a quilted appearance on an inner surface 48 of inner shell 40. Channels configured to receive the evaporator coil 44 may also be machined into the outer surface 46 of inner shell 40, which may produce a flat inner surface 48 of inner shell 40. The machined channels could be capped with a suitable material after receiving the evaporator coil 44 to protect the evaporator coil 44 from the environment, and to provide improved thermal coupling between the inner shell 40 and the evaporator coil 44.

With continued reference to FIGS. 2-4, the inner surface 48 of inner shell 40 may define a working space for receiving a working liquid 49 (FIG. 6), such as water, brine, ethylene glycol and water, propylene glycol and water, silicone oil, or any other suitable working liquid. The inner shell 40 may also include a weir or partition 50 that defines a primary chamber 52 and a secondary chamber 54. The primary chamber 52 may be configured to accept laboratory specimens, thereby providing the working space of reservoir 18. The secondary chamber 54 may be fluidically coupled to the primary chamber 52 through one or more openings 55 (FIG. 6) or apertures 158 (FIG. 15) in the partition 50 that allows the working liquid 49 to pass between the chambers 52, 54.

As best shown in FIG. 4, the heater 34 may include a heating element 56 located in a thermal chamber 58. The thermal chamber 58 may be located externally to the reservoir 18, such as below the inner shell 40 as depicted in FIG. 4. The thermal chamber 58 may be fluidically coupled to the secondary chamber 54 and the recirculating pump 38. The recirculating pump 38 may thereby cause the working liquid 49 to be drawn from the secondary chamber 54 through an inlet 60, passed through the thermal chamber 58, and returned to the secondary chamber 54 through an outlet 62. Although the recirculating pump 38 is shown as drawing working liquid 49 from the reservoir and expelling the working liquid 49 into the heater 34, a person having ordinary skill in the art would understand that the relative positions of the recirculating pump 38 and heater 34 could be reversed. The inlet 60 and outlet 62 could also be located in the primary chamber 52. Embodiments of the present invention are therefore not limited to the working liquid recirculation configurations shown.

The recirculating bath 10 may also include an external inlet connection 63 and an external outlet connection 65 (FIG. 6), each of which may be accessible from outside the housing 12 for connecting an external application (not shown). In embodiments including the external inlet and outlet connections 63, 65, the thermal chamber 58 may be fluidically coupled to the secondary chamber 54 by a restriction device 66 (FIG. 6), as is described in more detail below.

As the working liquid 49 passes through the thermal chamber 58, the working liquid may absorb heat from the heating element 56. The temperature of the working liquid 49 may be increased in a controlled manner by adjusting an amount of energy provided to the heating element 56. For example, the heating element 56 may be selectively coupled to a source of electrical energy by the controller 36 using Pulse Width Modulation (PWM). In this exemplary embodiment, the amount of thermal energy provided to the working liquid 49 may be controlled by adjusting the PWM duty cycle. The temperature of the working liquid 49 in the reservoir 18 may thereby be controlled by selectively activating the heating element 56 and/or recirculating pump 38.

As best shown in FIG. 3, the exemplary cooling unit 32 may include the aforementioned evaporator coil 44, a compressor 64, a condenser 68, and a drier 70. The cooling unit 32 may also include an expansion device (not shown) such as a stepper valve or other suitable metering device that lowers the line pressure between the condenser 68 and evaporator coil 44. One or more cooling fans 72 may be configured to circulate air over the condenser 68 to remove heat produced by the cooling unit 32. In operation, a suitable refrigerant, such as the aforementioned HFC, may be circulated through the components of the cooling unit 32 by the compressor 64 in a known manner to remove heat from the inner shell 40. The inner shell 40, in turn, may absorb heat from the working liquid 49 and conduct this heat to the evaporator coil 44, thereby reducing the temperature of the working liquid 49. The amount of heat removed from the working liquid 49 may be controlled by, for example, cycling the compressor 64 on and off. The temperature of the working liquid 49 in the reservoir 18 may thereby be controlled by selectively activating the cooling unit 32 in a similar manner as described above with respect to activation of the heating element 56.

Although the cooling unit 32 is described above as a heat pump that transfers thermal energy using compression and expansion of a suitable refrigerant, persons having skill in the art will understand that other devices may also be used to remove heat from the working liquid 49. For example, the cooling unit 32 may include a thermoelectric cooling device thermally coupled to the inner surface 48 of inner shell 40. Examples of thermoelectric devices include solid state devices that use the Peltier effect to transfer heat across a junction between two different types of materials. Embodiments of the present invention are therefore not limited to recirculating baths 10 having a cooling unit 32 that includes a heat pump.

Figure 6:
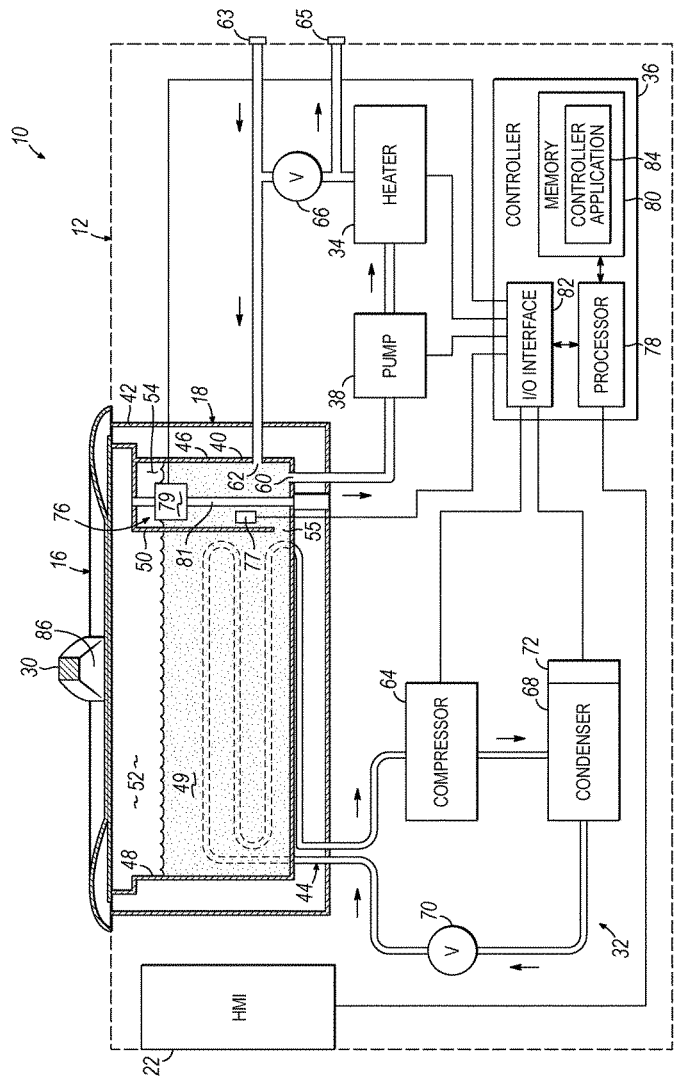
FIG. 6 is a schematic block diagram illustrating the reservoir, heater, recirculating pump, cooling unit, and a controller of the recirculating bath in accordance with an embodiment of the present invention.
Figure 11:
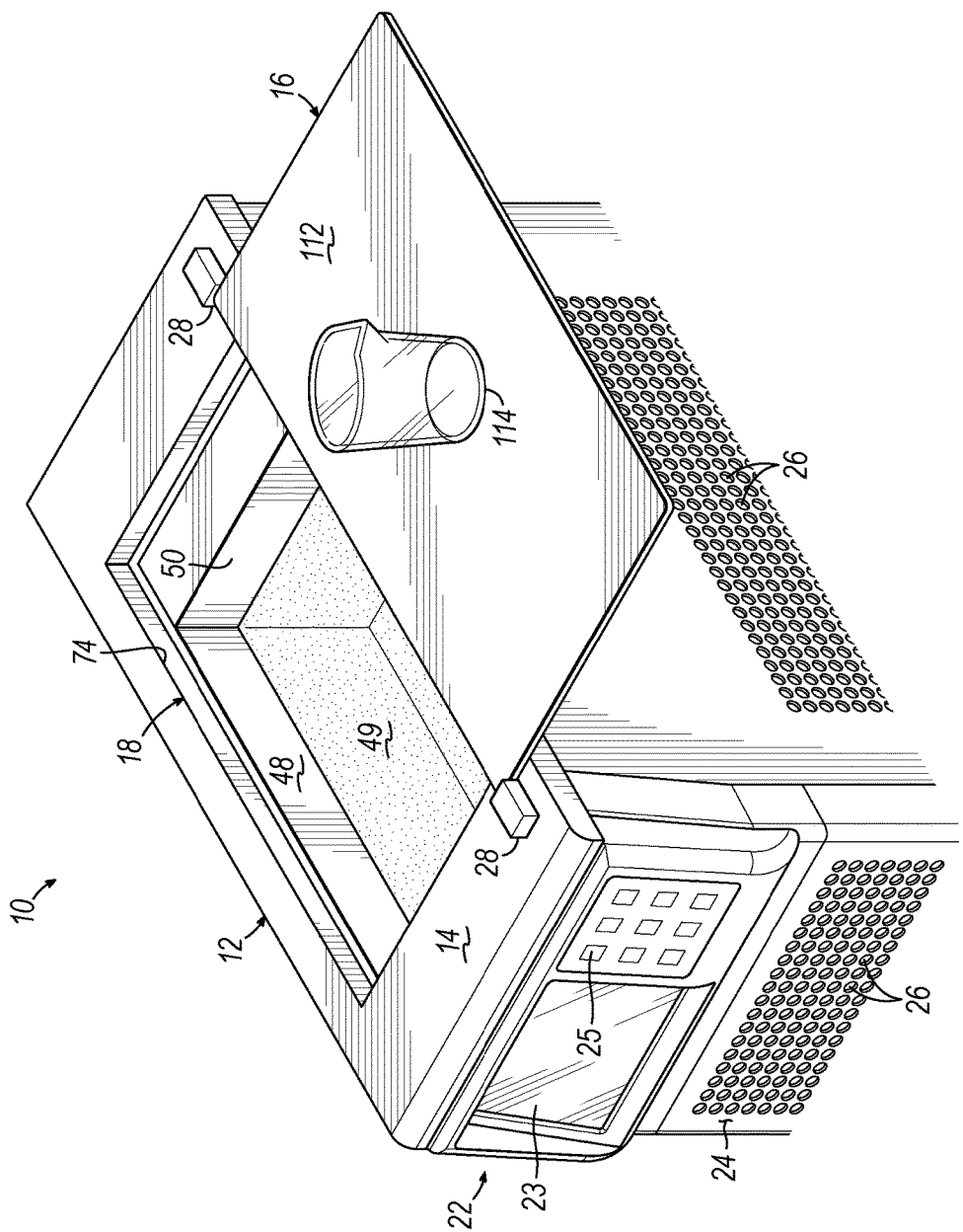
FIG. 11 is a perspective view of the recirculating bath of FIG. 1 with the lid in an open position that provides a staging area adjacent to the work area of the reservoir in accordance with an embodiment of the present invention.

As best shown in FIGS. 6 and 11, the primary chamber 52 may be configured to receive laboratory specimens or otherwise provide the user access to the working liquid 49 through an opening 74 in the top surface 14 of housing 12. By locating the inlet 60 and the outlet 62 in the secondary chamber 54, the secondary chamber 54 may be configured to provide a buffer between the working liquid 49 being returned by the recirculating pump 38, and the working liquid 49 in the primary chamber 52. The secondary chamber 54 may also prevent specimens from interfering with the uptake of working liquid 49 by the recirculating pump 38, as well as provide a protected area within the reservoir 18 for locating sensitive system components, such as working liquid level and temperature sensors.

Advantageously, by eliminating the need for a head unit, embodiments of the present invention enable the top surface 14 of housing 12 to provide an unobstructed work area. That is, the user may access the work area of reservoir 18 from any side of the recirculating bath 10 without being obstructed by components, such as the HMI 22, or portions of the cooling unit 32, heater 34, and recirculating pump 38. The lack of obstructions on the top surface 14 of housing 12 and in the reservoir 18 may also increase the usable working space for a given footprint of the recirculating bath 10. Efficient space utilization in labs and laboratory equipment is desirable due to the high cost of laboratory space. Thus, the additional work area provided by embodiments of the present invention may increase the utility of the recirculating bath 10 as compared to conventional baths that lack the unobstructed top surface feature. The unobstructed top surface 14 of housing 12 may also accommodate a larger lid 16 and opening 74, improving access to the work area of reservoir 18. Eliminating the need for a head unit may also reduce potential hazards to the user caused by reaching over extremely hot or cold working liquid 49 in order to access the HMI of the head unit. The unique configuration of the heater 34, recirculating pump 38, and evaporator coil 44 with respect to the reservoir 18 may also enable the recirculating bath 10 to continue to function at very low liquid levels.

Embodiments of the present invention do not require thermal elements, such as the evaporator coil 44 or the heating element 56, to be located in the reservoir 18. Thus, embodiments of the present invention may provide increased reservoir capacity as compared to conventional baths that require thermal elements and immersion pumps to be located in the reservoir 18. Removing these components from the reservoir 18 may also facilitate cleaning of the reservoir 18, since there is no need to remove a head unit to access the entire reservoir. In addition, the presence of the evaporator coil in the reservoir of a conventional circulator bath can make it difficult to clean the reservoir, and may result in damage to the evaporator coil. By removing the thermal elements from the working space, embodiments of the present invention may reduce the likelihood of damaging these components while cleaning the reservoir 18. Embodiments of the present invention may also reduce cross-contamination from inadequate cleaning due to the thermal elements getting in the way while cleaning the reservoir 18.

Referring now to FIG. 6, a schematic view of an embodiment of the present invention illustrates the controller 36 operatively coupled to the heater 34, the recirculating pump 38, the compressor 64, cooling fans 72, a level sensor 76, and a temperature sensor 77. The level and temperature sensors 76, 77 may be located in the secondary chamber 54. The level sensor 76 may comprise at least one float 79 laterally located by a guide rod 81. The float 79 may be buoyant in the working liquid 49 so that the float 79 moves vertically along the guide rod 81 in response to changes in the level of the working liquid 49. The level sensor 76 may sense the position of the float 79, and provide a signal to the controller 36 indicative of the level of the working liquid 49 in the reservoir 18 based on the sensed position. The controller 36 may thereby determine if the recirculating bath 10 has sufficient working liquid 49 for operation.

In response to the controller 36 determining that there is not a sufficient amount of working liquid 49, the controller 36 may shut off the recirculating bath and/or generate an alarm that alerts the user. Although depicted as located in the secondary chamber, the temperature sensor 77 may be located in any suitable location that enables the temperature sensor 77 to sense the temperature of the working liquid 49. The temperature sensor 77 may provide a signal indicative of the temperature of the working liquid 49 to the controller 36. The controller 36 may, in turn, use this signal to control the temperature of the working liquid 49.

When used without an external application, the external inlet and outlet connections 63, 65 may be capped or otherwise blocked so that the working liquid 49 passes through the restriction device 66 to complete the recirculation circuit. To this end, the external inlet and outlet connections 63, 65 may include threads (not shown) so that caps can be selectively coupled to the external inlet and outlet connections 63, 65. An external application may be coupled to the recirculating pump 38 by uncapping the external inlet and outlet connections 63, 65 and connecting the external application to the external inlet and outlet connections 63, 65. This connection may be made using any suitable means, such as one or more lengths of flexible plastic tubing.

The restriction device 66 may provide a desired amount of resistance to the flow of the working liquid 49 using, for example, an orifice having a fixed diameter. The restriction device 66 may also include a valve that allows the user to add a selective amount of resistance or even shut off flow through the restriction device 66. In any case, the restriction device 66 may provide sufficient resistance to the flow of the working liquid 49 so that, when coupled to the external application, at least a portion of the working liquid 49 flows out of the external outlet connection 65, through the external application, and back into the external inlet connection 63. The external inlet and outlet connections 63, 65 may be located in any suitable location, such as at the rear of the housing 12, to facilitate coupling external applications to recirculating bath 10.

The controller 36 may include the HMI 22, a processor 78, a memory 80, and an input/output (I/O) interface 82. The processor 78 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 80. Memory 80 may be a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing digital information. Memory 80 may also include a mass storage device (not shown), such as a hard drive, optical drive, tape drive, non-volatile solid state device or any other device capable of storing digital information.

Processor 78 may execute program code embodied as one or more computer software applications, such as a controller application 84 residing in memory 80. The controller application 84 may be configured to cause the controller 36 to operate the recirculating bath in a desired manner based on input received from the HMI 22 and/or programming instructions stored in memory 80. The I/O interface 82 operatively couples the processor 78 to other components of the recirculating bath 10, such as the heater 34, recirculating pump 38, compressor 64, cooling fans 72, level sensor 76, and temperature sensor 77.

The I/O interface 82 may include signal processing circuits that condition incoming and outgoing signals so that the signals are compatible with both the processor 78 and the components to which the processor 78 is coupled. To this end, the I/O interface 82 may include analog to digital (A/D) and/or digital to analog (D/A) converters, voltage level and/or frequency shifting circuits, optical isolation and/or driver circuits, and/or any other analog or digital circuitry suitable for coupling the processor 78 to the other components of the recirculating bath 10.

The HMI 22 may be operatively coupled to the processor 78 of controller 36 in a known manner to allow the user to interact with the controller 36. To this end, the HMI 22 may include output devices, such as the display 23, a touch screen, a speaker, and other audio and visual indicators. The HMI 22 may also include input devices and controls, such as the touch screen, the keypad 25, an alphanumeric keyboard, a pointing device, pushbuttons, control knobs, microphones, etc., capable of accepting commands or input from the user and transmitting the entered input to the processor 78.

The controller application 84 may be configured to receive user input from the HMI 22, such as input indicating a desired temperature of the working liquid. The controller application 84 may compare this desired temperature to the actual temperature of the working liquid 49, which may be determined from the signal provided by the temperature sensor 77. The difference in temperature between the desired temperature and the actual temperature may generate an error signal. The controller application 84 may process this error signal using a suitable control algorithm, such as a Proportional-Integral-Derivative (PID) or thermostatic algorithm, to determine if one or more of the heater 34, recirculating pump 38, or compressor 64 of cooling unit 32 should be activated. The controller application 84 may thereby control the temperature of the working liquid 49. In an embodiment of the present invention, the temperature sensor 77 may be located near the external inlet connection 63 or external outlet connection 65 so that the controller application 84 adjusts the temperature of the working liquid 49 based on the temperature of the working liquid 49 being provided to, or received from, the external application.

Figure 7:
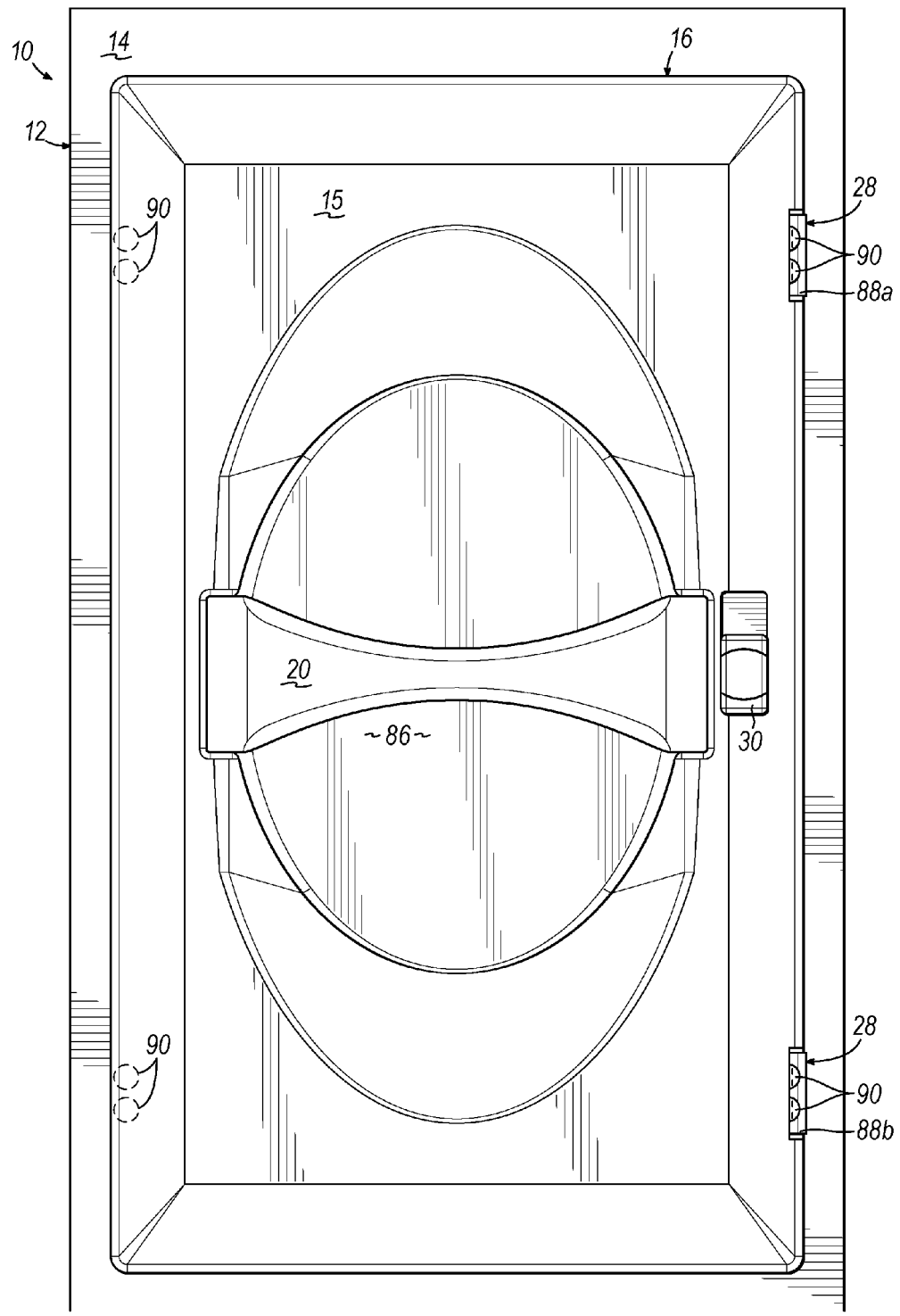
FIG. 7 is a top view of the lid of FIG. 1 illustrating a selector for latching and unlatching hinges of the lid in accordance with an embodiment of the present invention.

Referring now to FIG. 7, a top view illustrating additional details of the lid 16 is presented. The lid 16 may include a concavity 86 below the handle 20 to provide room for the user's fingers when gripping the handle 20. In the illustrated embodiment, the hinges 28 are shown as being located on one side of the lid 16 so that the lid 16 may be opened with a pivoting motion by pulling on the handle 20 without unlatching the lid 16. However, as discussed below, embodiments of the present invention may include lids 16 that have hinges 28 on opposing sides so that the lid 16 can be latched in a closed position. In any case, the pivoting motion provided by the hinges 28 may be such that working liquid 49 which has condensed on a bottom surface 112 (FIG. 11) of the lid 16 drains back into the reservoir 18 when the lid 16 is opened.

While in use with an external application, the lid 16 may be closed and/or latched to prevent users from inadvertently placing samples into the reservoir 18. Maintaining the lid 16 in a closed position may also prevent users from inadvertently adding working liquid 49 while an experiment is underway, thereby changing the temperature of the working liquid 49 in an undesirable manner.

Figure 8:
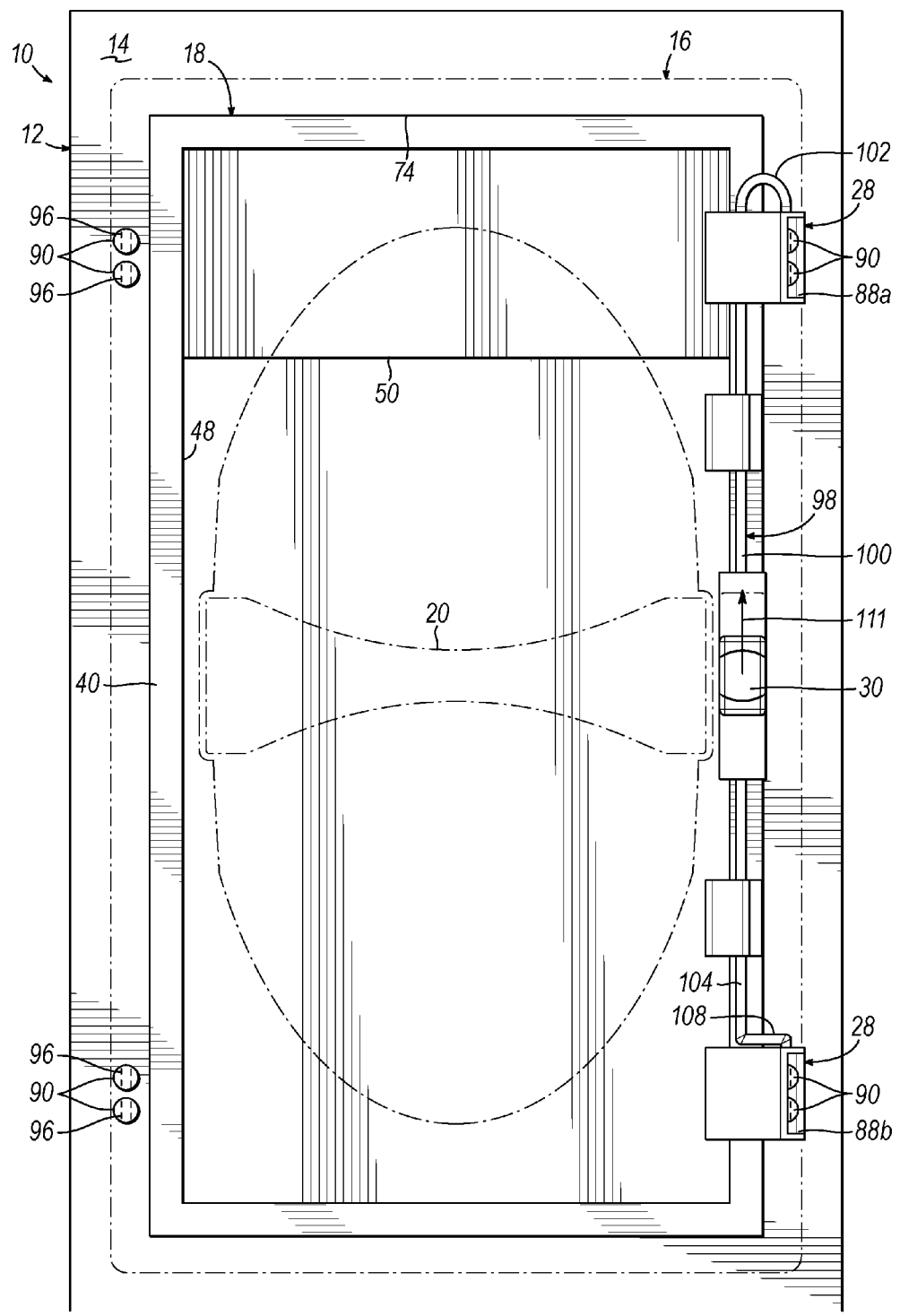
FIG. 8 is a cutaway view of the lid of FIG. 7 illustrating a linkage coupling the selector to the hinges in accordance with an embodiment of the present invention.
Figure 9:
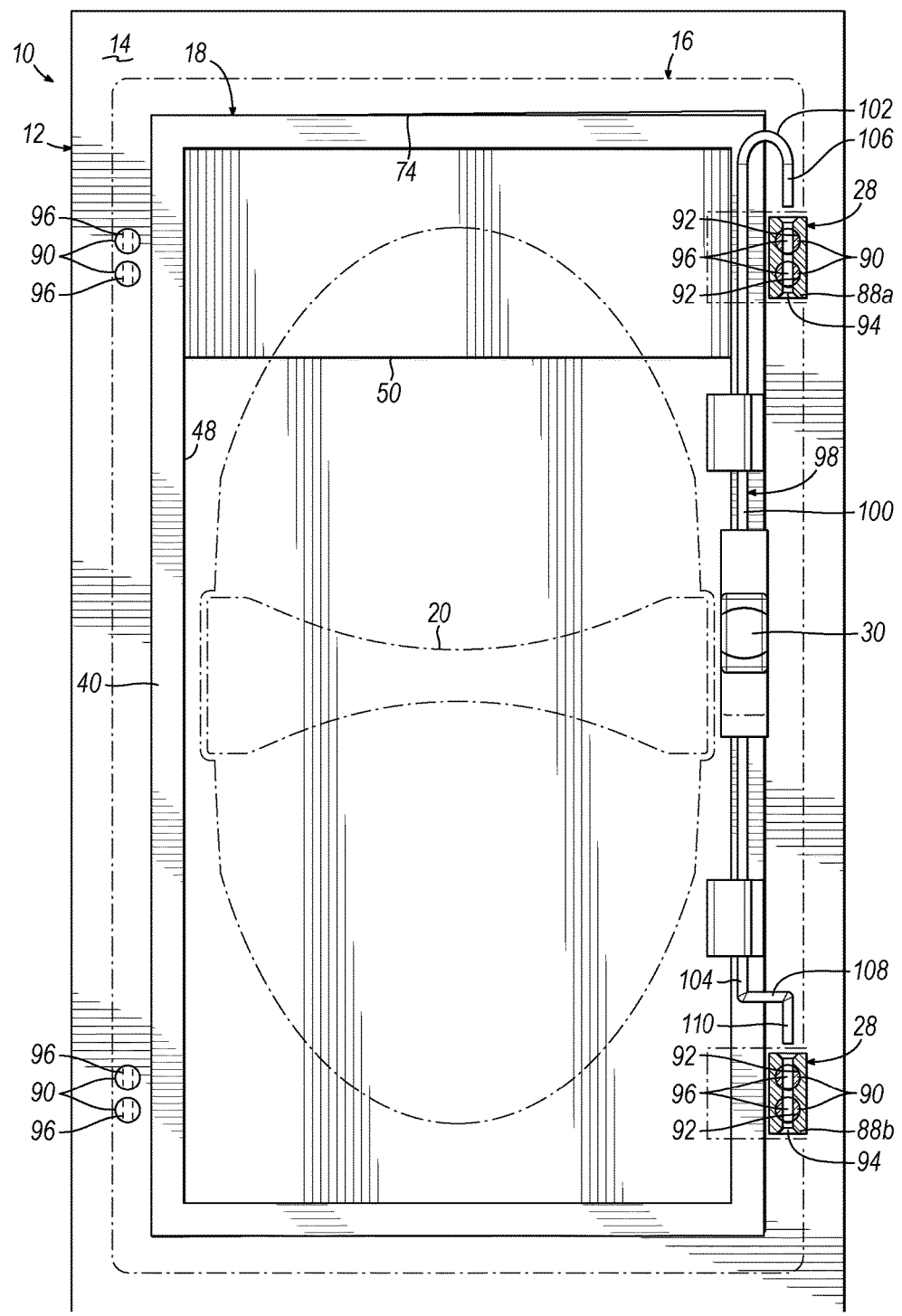
FIG. 9 is a cutaway view of the lid of FIGS. 7 and 8 illustrating the selector and linkage in a position that unlatches the hinges in accordance with an embodiment of the present invention.
Figure 10:
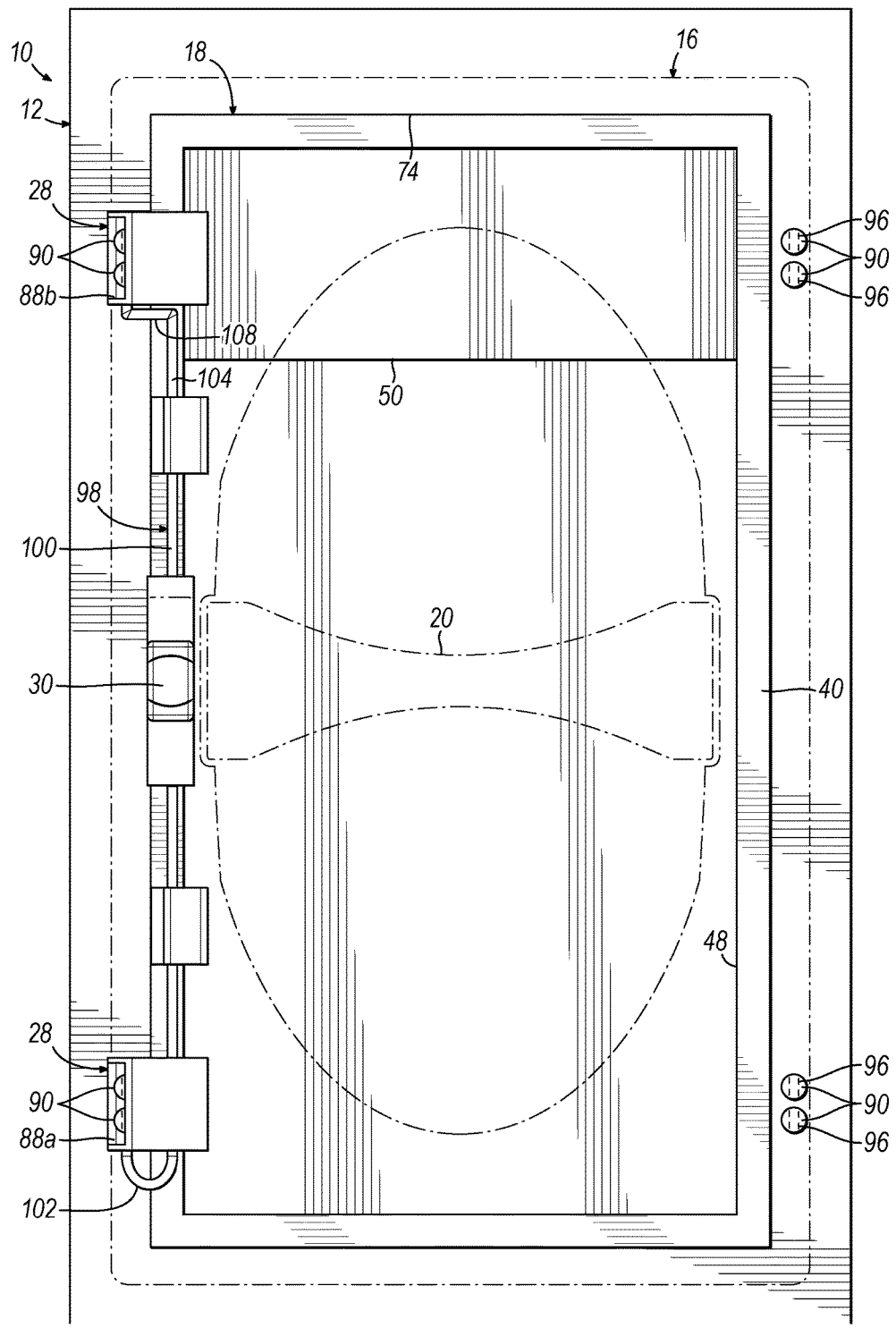
FIG. 10 is a cutaway view of the lid of FIGS. 7-9 with the lid reversed and illustrating the selector and linkage in a position that latches the hinges in accordance with an embodiment of the present invention.

Referring now to FIGS. 8-10, cutaway and perspective views of the lid 16 illustrate operation of the hinges 28 in an embodiment of the present invention. Each hinge 28 may include a keeper 88a, 88b configured to engage one or more posts 90 that project upward from the top surface 14 of housing 12. To this end, each keeper 88a, 88b may include a corresponding number of vertical holes 92 configured to receive the posts 90, and a horizontal guide hole 94 oriented along the pivot axis of corresponding hinge 28. Each post 90 may likewise include a horizontal guide hole 96 that is aligned with the pivot axis of corresponding hinge 28 when the post 90 is engaged with the corresponding keeper 88a, 88b. The posts 90 may be located in proximity to the opening 74 of reservoir 18 so that the lid 16 is positioned over the opening 74 when the keepers 88a, 88b are engaged with the posts 90.

The lid 16 may further include a linkage 98 that couples the selector 30 to the hinges 28. The linkage 98 may include a middle section 100 that couples an upper section 102 of linkage 98 to a lower section 104 of linkage 98. The upper section 102 may have a U-shape that aligns an end portion 106 of upper section 102 with the guide hole 94 of corresponding keeper 88a. The lower section 104 may include a lateral offset 108 that aligns an end portion 110 of lower section 104 with the guide hole 94 of corresponding keeper 88b.

Figure 8A:
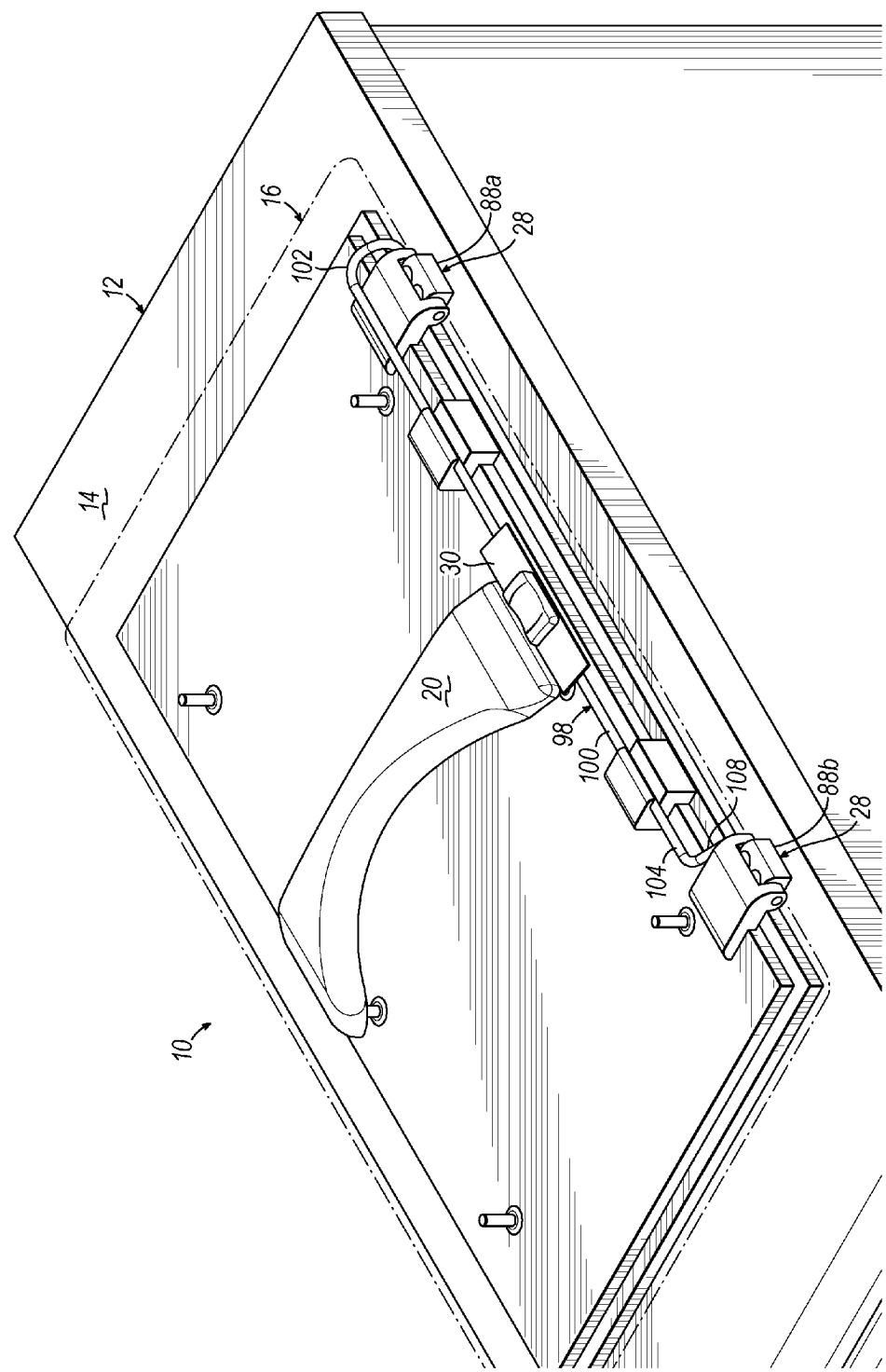
FIG. 8A is a perspective view of the lid of FIG. 8 illustrating a linkage coupling the selector to the hinges in accordance with an embodiment of the present invention.

As best shown in FIGS. 8 and 8A, when the selector 30 is in the latched position, the end portions 106, 110 of linkage 98 may engage the horizontal guide holes 94, 96 of keepers 88a, 88b and posts 90, respectively. The end portions 106, 110 may thereby act as hinge-pins that pivotally couple the keepers 88a, 88b with the posts 90 to form hinges 28 when the selector 30 is in the latched position.

Figure 9A:
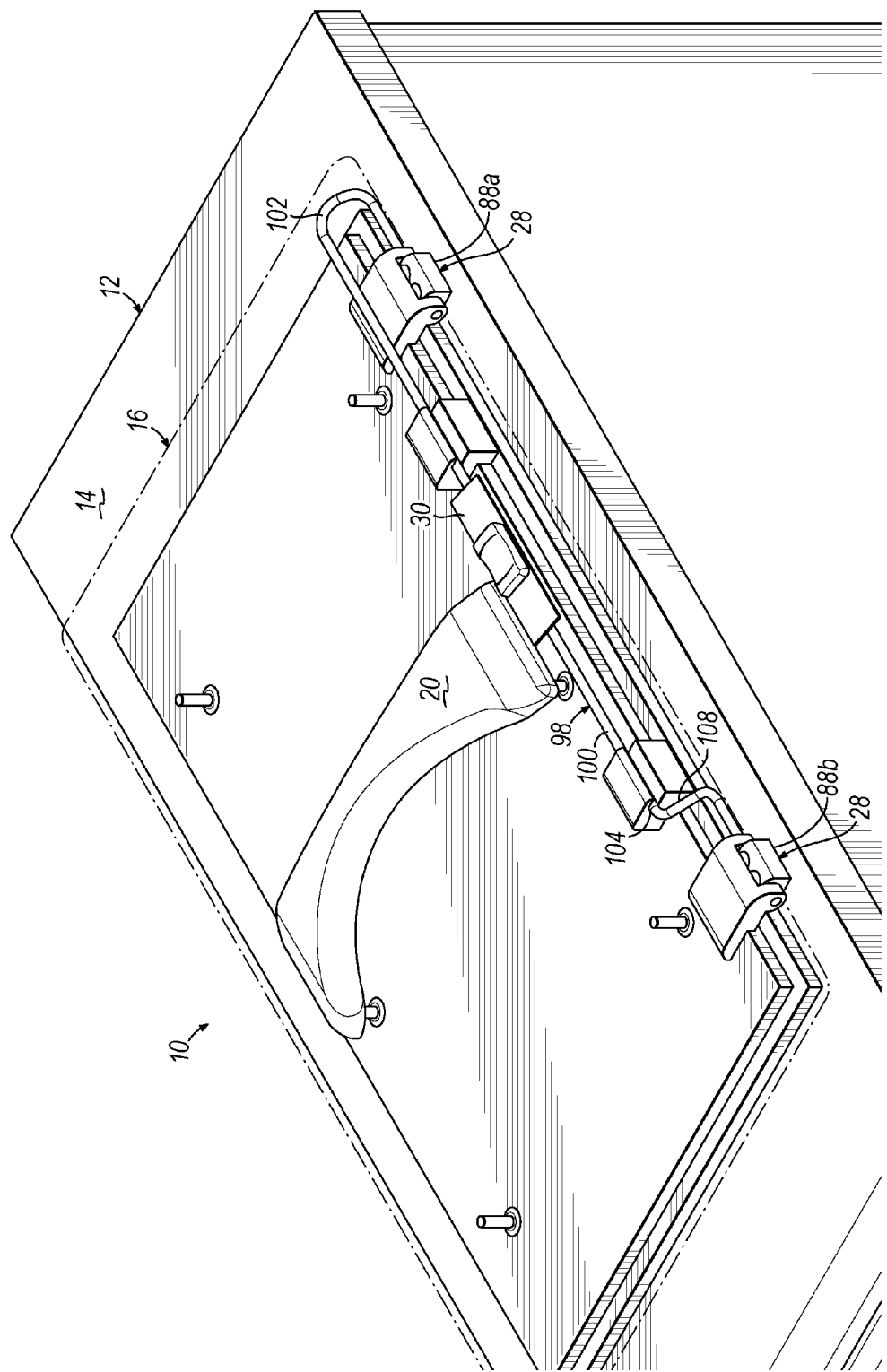
FIG. 9A is a perspective view of the lid of FIG. 9 illustrating the selector and linkage in a position that unlatches the hinges in accordance with an embodiment of the present invention.

As best shown in FIGS. 9 and 9A, in response to moving the selector 30 from the latched position to the unlatched position (as indicated by arrow 111 of FIG. 8), the end portions 106, 110 of linkage 98 may disengage from the horizontal guide holes 96 of posts 90. In this unlatched state, the keepers 88a, 88b may be uncoupled from the posts 90, allowing the lid 16 to be removed from the recirculating bath 10. As best shown in FIG. 10, the lid 16 may be rotated so that the keepers 88a, 88b engage posts 90 on the other side of the opening 74 of reservoir 18. Thus, the lid 16 may be configured to pivotally open in either of two horizontally offset axes depending on user preferences. In an alternative embodiment of the present invention, the lid 16 may include the selector 30, keepers 88a, 88b, and linkages 98 on two opposing sides of the lid 16. This alternative configuration may allow the lid 16 to be latched on two sides so that the lid 16 is positively held in place by the hinges 28. That is, the lid 16 could be latched on both sides so that the lid 16 may not be opened unless one side is first unlatched. The lid 16 could then be opened by unlatching one side of the lid 16 and pivoting the lid 16 about the latched axis, or by unlatching both sides and removing the lid 16.

Although the lid 16 is depicted herein as having a generally oblong rectangular shape with the hinges 28 located on one or more of the long sides of the lid 16, it is contemplated that the lid 16 could have hinges 28 located on one or more of the short sides. It is further contemplated that the lid 16 could have shapes other than shown, such as a square, a shape with more or less than four sides, and/or a shape having curved sides. In addition, in an alternative embodiment of the present invention, the posts 90 may be included on just one side of the opening 74, in which case the lid 16 would be limited to opening about a single pivot axis on one side of the reservoir 18. The hinges 28 could also include another latched state in which the lid 16 is fixedly latched. That is, in this fixedly latched state, the hinges 28 would be prevented from pivoting about the latched axis. This would allow, for example, the lid 16 to be latched in a partially open position.

Referring now to FIG. 11, in an embodiment of the present invention, the top surface 14 of housing 12, the lid 16, and the hinges 28 may be configured so that the lid 16 can be pivoted approximately 180 degrees. In this fully open position, a portion of the top surface 15 of lid 16 may come into contact with the top surface 14 of housing 12 so that the lid 16 is held in a generally horizontal position as depicted in FIG. 11. The underside or bottom surface 112 of lid 16 may thereby provide a working surface in the fully open position. Advantageously, this working surface may provide a convenient place for staging specimens that are being placed in or removed from the reservoir 18, such as the exemplary beaker 114. This configuration may also allow working liquid 49 that accumulates on the working surface, such as from samples recently removed from the reservoir 18 or condensation, to run back into the reservoir 18 as the lid is tilted from the fully open position back to the closed position.

Advantageously, by allowing the lid to pivot into the fully open position, embodiments of the present invention may eliminate the need for the user to find a surface on which to place the lid 16 while accessing the work area of reservoir 18. This feature may reduce the chance of contamination, and prevent working liquid from being undesirably deposited on lab surfaces as a result of condensation on the bottom of the lid 16. In addition, in embodiments having a reversible lid 16, the user may configure the recirculating bath 10 to accommodate their laboratory workspace. The latching hinges 28 may also enable the lid to be removed without tools, increasing the convenience and utility of the recirculating bath 10.

Figure 12:
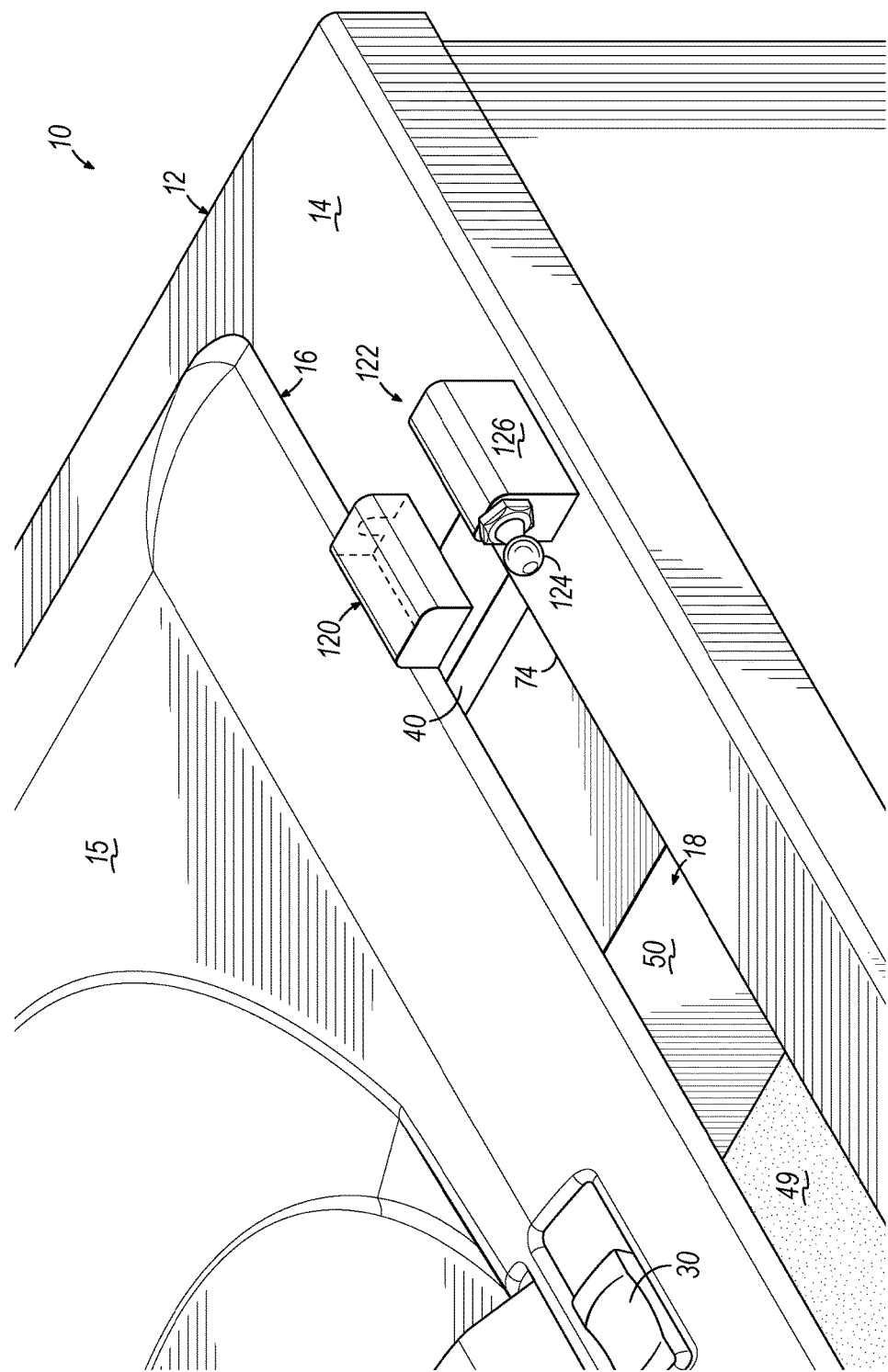
FIG. 12 is a perspective view of a hinge, including a keeper and a post in accordance with an alternative embodiment of the present invention.
Figure 13:
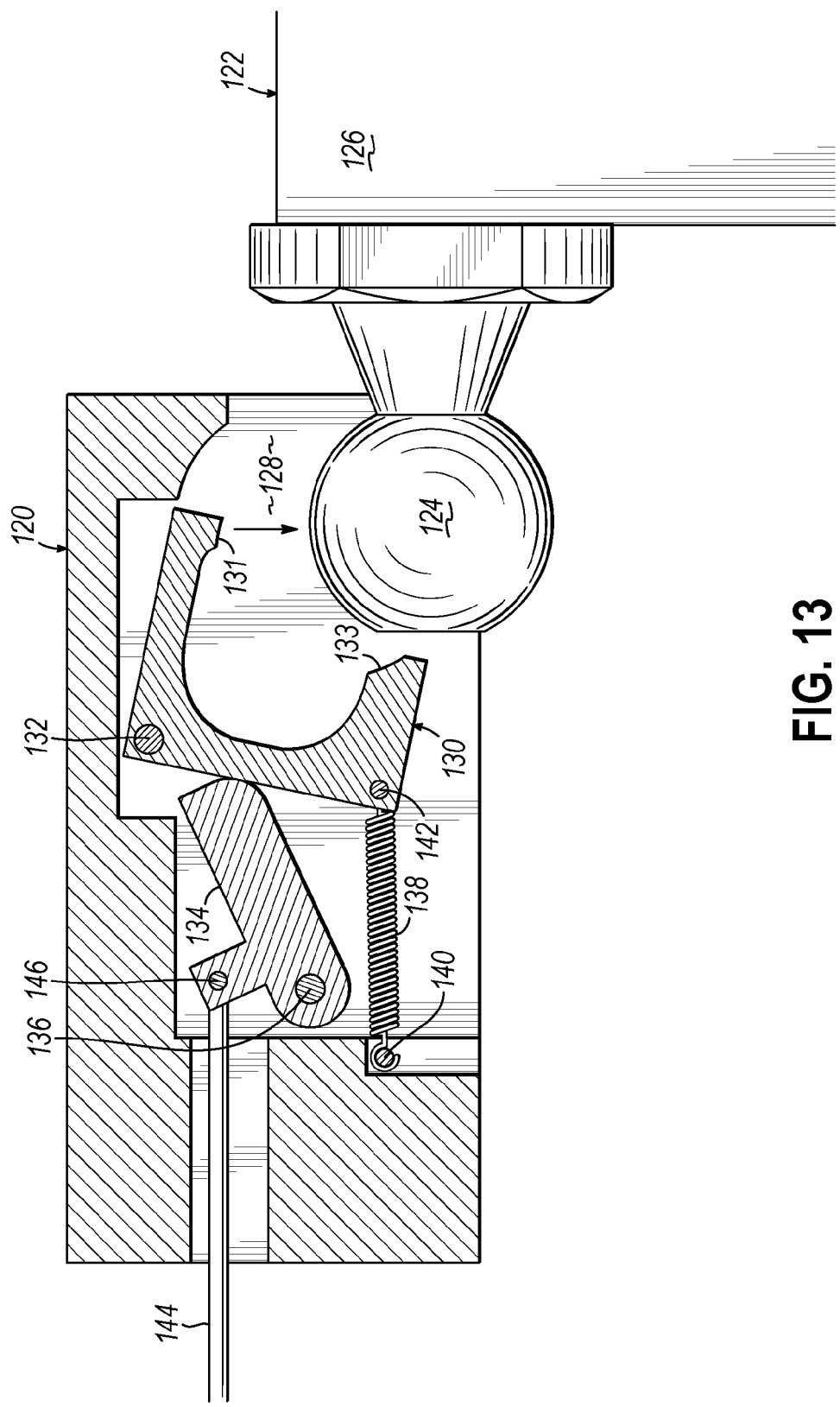
FIG. 13 is a front cutaway view of the keeper of FIG. 12 illustrating a cam and sear in an unlatched position in accordance with an embodiment of the present invention.
Figure 14:
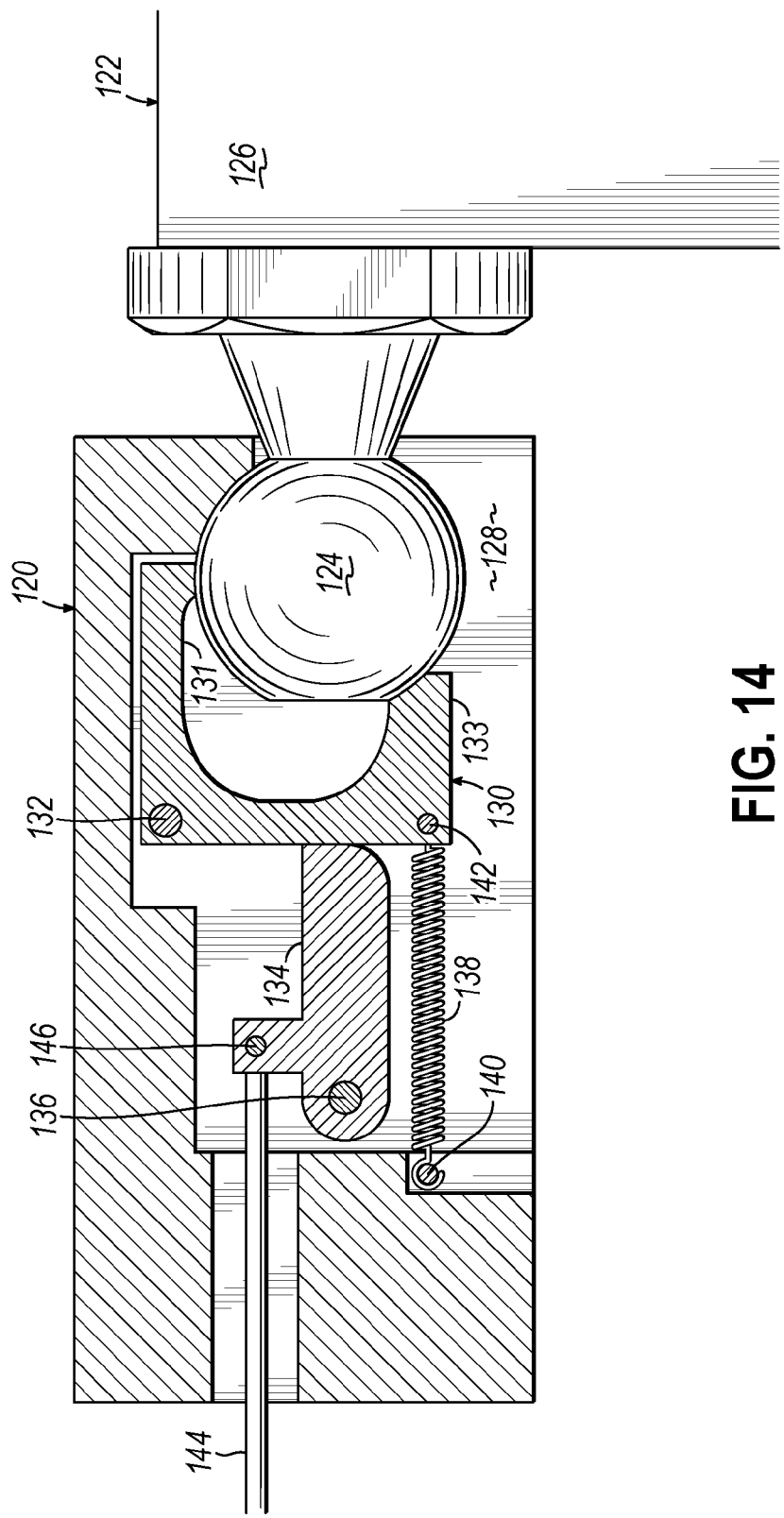
FIG. 14 is a front cutaway view of the hinge of FIGS. 12 and 13 illustrating the keeper engaging the post with the cam and sear in a latched position in accordance with an embodiment of the present invention.

Referring now to FIGS. 12-14, in an alternative embodiment of the present invention, the hinges 28 may comprise one or more keepers 120 affixed to the lid 16, and one or more posts 122 affixed to the top surface 14 of housing 12. Each of the posts 122 may include a ball 124 that projects outward from a column 126. Although in the exemplary embodiment, the ball 124 is depicted as a generally spherical member that projects outward laterally from the column 126, persons having ordinary skill in the art will understand that the ball 124 may have other shapes, such as ellipsoid or cylindrical shapes, and that the ball 124 may also project outward vertically, or reside within the column 126. Embodiments of the present invention are therefore not limited to the depicted configuration.

As best shown in FIGS. 13 and 14, the keeper 120 may include a cavity 128 configured to receive the ball 124, and a cam 130 having an upper tine 131 and a lower tine 133. The cam 130 may be pivotally coupled to the keeper 120 at a pivot point 132. The keeper 120 may further include a sear 134 pivotally coupled to the keeper 120 at a pivot point 136, and a spring 138 that provides tension between a coupling point 140 on the keeper 120 and a coupling point 142 on the cam 130. The spring 138 may thereby urge the cam 130 against the sear 134. The sear 134 may also be coupled to a linkage 144 at a pivot point 146. The linkage 144 may thereby couple the sear 134 to the selector 30 or some other suitable mechanism for selecting the state of the hinge 28.

As best shown in FIG. 13, in response to the linkage 144 being in a withdrawn or "unlatched" position, the sear 134 may be pivoted upward, releasing the cam 130. In the unlatched state shown, the cam 130 may be oriented so that the upper and lower tines 131, 133 release the ball 124, allowing the keeper 120 to be separated from the post 122. As best shown in FIG. 14, in response to the keeper 120 being urged into engagement with the post 122, the cam 130 may rotate about the pivot point 132 so that the upper and lower tines 131, 133 clamp the ball 124. The rotation of the cam 130 may also cause the sear 134 to rotate about the pivot point 136, urging the linkage 144 into an extended or "latched" position. While the linkage 144 is in this extended position, the sear 134 may lock the cam 130 in place. The cam 130 and ball 124 may be configured so that in the locked position, the upper and lower tines 131, 133 allow pivotal movement of the keeper 120 about the ball 124, but locate the keeper 120 laterally with respect to the post 122 so that the lid 16 is hingedly coupled to the housing 12.

Figure 15:
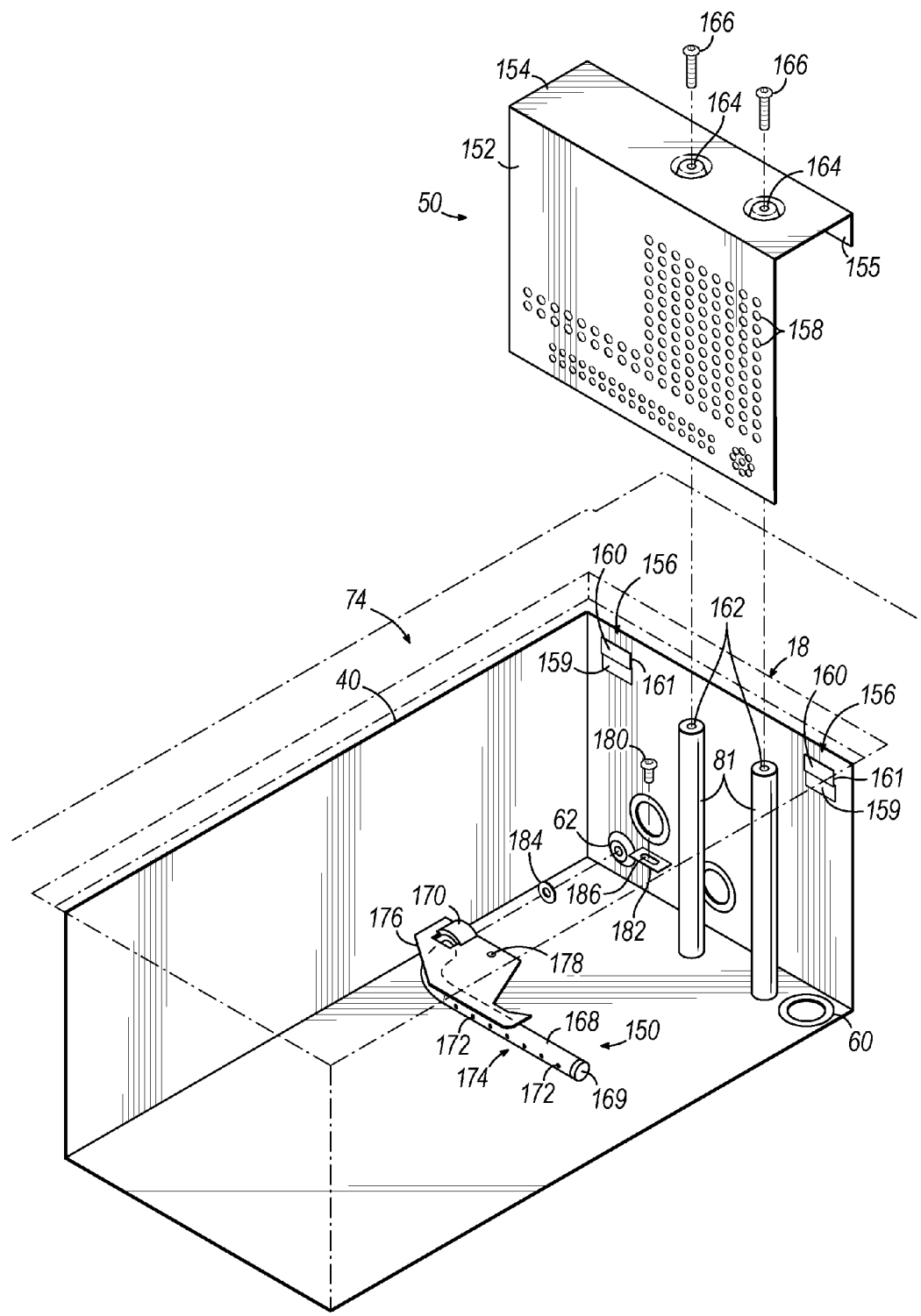
FIG. 15 is an exploded perspective view of the recirculating bath in FIG. 3 with the cooling unit removed to show details of a manifold and a partition in accordance with an embodiment of the present invention.
Figure 16:
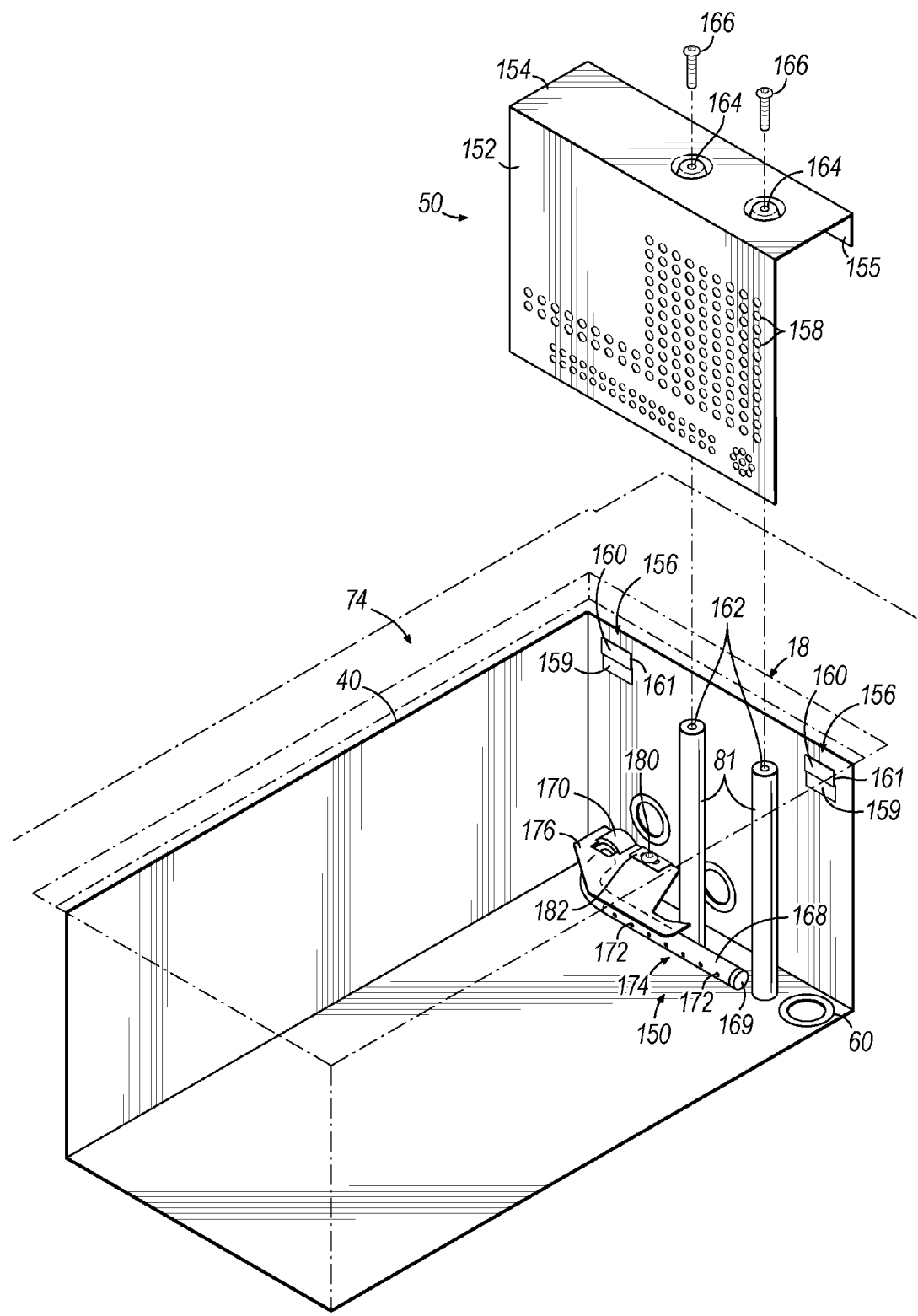
FIG. 16 is a perspective view of the recirculating bath in FIG. 15 showing the manifold located in an operating position.

Referring now to FIGS. 15 and 16, an exemplary embodiment of the recirculating bath 10 is illustrated in an exploded perspective view (FIG. 15) and a partially assembled view (FIG. 16) showing the weir or partition 50, a plurality (e.g., two) guide rods 81, and a manifold 150. The partition 50 may comprise a vertical section 152 configured to separate the primary chamber 52 from the secondary chamber 54, a horizontal section 154 that spaces the vertical section 152 from the inner shell 40, and a tab 155 configured to engage one or more clips 156. The vertical section 152 of partition 50 may include one or more apertures 158 that allow working liquid 49 to flow between the primary chamber 52 and the secondary chamber 54. The configuration, number, and placement of the apertures 158 may be varied in order to adjust how the working liquid 49 flows between the primary and secondary chambers 52, 54. Persons having ordinary skill in the art will therefore understand that embodiments of the present invention are not limited to partitions 50 having the configuration of the apertures 158 depicted in FIG. 15.

The clips 156 may include a lower portion 159 that is attached to the inner shell 40, such as by spot welding, and an upper portion 160 that is horizontally offset from the lower portion 159. The clips 156 may be configured so that when the lower portion 159 is attached to the inner shell 40, a gap 161 is defined between the upper portion 160 of the clip 156 and the inner shell 40. The clip 156 may be further configured so that the gap 161 has a sufficient width to receive the tab 155 of partition 50. The clips 156 may thereby be configured to locate the partition 50 relative to the inner shell 40 by engaging the tab 155 when the partition 50 is installed in the recirculating bath 10.

Each guide rod 81 may include a threaded hole 162 located in the top of the guide rod 81, and the partition 50 may include one or more apertures 164 in the horizontal section 154. The partition 50 may be configured so that each of the apertures 164 in the horizontal section 154 aligns with a corresponding one of the threaded holes 162 in the guide rods 81 when the tab 155 is engaged with the clips 156. The threaded holes 162 and apertures 164 may thereby enable the partition 50 to be secured to the guide rods 81 by screws 166 or other suitable fasteners.

According to one embodiment, the manifold 150 may comprise an elongated hollow body 168 coupled to an inlet coupling 170. The elongated hollow body 168 may be formed from a tube or other suitable elongated body, and may include one or more apertures 172 forming an outlet 174. The elongated hollow body 168 may be closed at an end 169 remote from the inlet coupling 170, and include a bend between the inlet coupling 170 and the outlet 174 to orient the outlet 174 at a desired angle within the reservoir 18. The bend may be, for example, a 90 degree mandrel bend so that a portion of the elongated hollow body 168 is oriented parallel to the side of the inner shell 40 including the outlet 62.

The outlet 174 of manifold 150 may be configured to discharge working liquid 49 from the manifold 150 into the reservoir 18. To this end, the outlet 174 may comprise a plurality of apertures 172 in a linear arrangement as depicted in the exemplary embodiment shown. In alternative embodiments of the present invention, the outlet 174 may comprise one or more apertures 172 having circular shapes, elongated shapes such as ovals or slots, or any other suitable shape. The outlet 174 may also comprise a single aperture 172, such as an elongated slot running lengthwise on the elongated hollow body 168, for example. The apertures 172 may also be arranged in patterns other than the linear arrangement shown in FIG. 15, and may include nozzles or other passages of varying cross sectional area for directing or modifying the flow of the working liquid 49 from the manifold 150. The outlet 174 may thereby be configured to control the flow of the working liquid 49 from the manifold 150 to obtain a desired flow characteristic or circulation in the reservoir 18.

The manifold 150 may further comprise a flange 176 that couples the manifold 150 to the inner shell 40. The flange 176 may comprise a plate of stainless steel, aluminum, plated or coated metal, plastic, or any other suitable material. The flange 176 may be attached to portions of the elongated hollow body 168 on each side of the bend by welding, brazing, soldering, or any other suitable method. The flange 176 may thereby stiffen the manifold 150 with respect to forces acting parallel to a plane defined by the flange 176.

The flange 176 may include an aperture 178 configured to receive a screw 180 or other fastener that couples the flange 176 to a bracket 182 projecting outward from the inner shell 40. The flange 176 and bracket 182 may be configured so that when the flange 176 is coupled to the bracket 182 using the screw 180, the inlet coupling 170 of manifold 150 is fluidically coupled to the outlet 62. A gasket or washer 184 may be located between the outlet 62 and the inlet coupling 170 to improve sealing between the outlet 62 and manifold 150. The aperture 178 of flange 176 and/or an aperture 186 in the bracket 182 may be elongated or otherwise configured to allow adjustment of the position of the manifold 150 with respect to the inner shell 40 and outlet 62. The manifold 150 may thereby be positioned so that the inlet coupling 170 is pressed into a sealing engagement with the outlet 62.

In an alternative embodiment of the present invention, the outlet 62 and inlet coupling 170 may be configured to provide a positive mechanical attachment between the manifold 150 and the outlet 62. For example, the outlet 62 may include a cylindrical projection (not shown) including threads or one or more tabs defined in an internal or external surface of the projection. In this embodiment, the inlet coupling 170 may include corresponding threads or recesses configured to receive the threads or tabs of the outlet 62. The outlet 62 and inlet coupling 170 of manifold 150 may thereby form what is commonly referred to as a bayonet-type coupling.

In this alternative embodiment of the present invention, the tabs or threads could be keyed to ensure that the manifold 150 may only be inserted into the outlet in a specific orientation, such as by, for example, making one of the tabs a different size than the other tabs. The manifold 150 may thereby be configured so that the outlet 62 only allows the inlet coupling 170 to be inserted when the elongated hollow body 168 is oriented at a specific angle relative to horizontal, e.g., a 45 degree or any other suitable angle. Once inserted, the manifold 150 may be rotated clockwise with respect to the viewpoint of FIG. 15 until the elongated hollow body 168 reaches a fully engaged position, which may occur when the elongated hollow body 168 is in a horizontal or other desired operating position. The rotation of the manifold 150 may tighten the engagement between the inlet coupling 170 of manifold 150 and the outlet 62 until a final or locked position is reached. In embodiments of the present invention in which the outlet 62 and inlet coupling 170 are configured to provide a positive mechanical attachment, one or more of the flange 176, aperture 178, screw 180, and bracket 182 used to secure the manifold 150 may be omitted.

Advantageously, the manifold 150 may provide a mechanism for adjusting the flow of working liquid 49 in the reservoir 18. The manifold 150 may thereby provide a more uniform distribution of the flow of the working liquid 49 from the outlet 62 into the reservoir 18. This uniform distribution may, in turn, result in the recirculating bath 10 having an improved temperature distribution within the reservoir 10 as compared to baths lacking the manifold 150.

The manifold 150 may also provide a level of resistance to the flow of the working liquid 49 out of the outlet 62. The resistance provided by the manifold 150 may increase the pressure of the working fluid at the restriction device 66. The resulting back-pressure provided by the manifold 150 may thereby reduce the pressure drop across restriction device 66, with a corresponding drop in cavitation of the working liquid 49 as the working liquid passes through the restriction device 66. This drop in cavitation may reduce the operating noise of the recirculating bath 10, and allow essentially cavitation-free operation of the recirculating bath 10 at higher temperatures and flow rates as compared to recirculating baths lacking the manifold 150.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the present invention in its broader aspects is not limited to the specific details of the representative apparatus and method, and illustrative examples shown and described. Accordingly, departures may be made from such details without departing from the spirit or scope of applicants' general inventive concept.

What is claimed is:

1. A recirculating bath comprising: a reservoir including an interior surface that defines a first space configured to receive a working liquid; a thermal element located externally to the first space and thermally coupled to the working liquid to transfer heat between the working liquid and the thermal element; and a recirculating pump located externally to the first space and fluidically coupled to the first space to circulate the working liquid through the first space, wherein the reservoir includes a partition that defines a primary chamber and a secondary chamber within the first space, the secondary chamber being fluidically coupled to the primary chamber, the primary chamber defining a work area of the reservoir, and the recirculating pump including an inlet and an outlet each fluidically coupled to the primary chamber via the second chamber.

2. The recirculating bath of claim 1, wherein the thermal element is thermally coupled to the working liquid by the interior surface of the reservoir.

3. The recirculating bath of claim 2, wherein the thermal element is an evaporator coil.

4. The recirculating bath of claim 1, further comprising:
a thermal chamber external to the reservoir and enclosing at least a portion of the thermal element, the thermal chamber being fluidically coupled to the first space by the recirculating pump so that the working liquid circulated through the first space by the recirculating pump passes through the thermal chamber.

5. The recirculating bath of claim 4, wherein the thermal element is a heating element.

6. The recirculating bath of claim 5, further comprising:
a controller operatively coupled to the heating element, the controller selectively activating the heating element so that the working liquid is maintained at a desired temperature.

7. The recirculating bath of claim 1, further comprising:
a cooling unit including a compressor and an evaporator, the thermal element comprising at least a portion of the evaporator.

8. The recirculating bath of claim 7, further comprising:
a first shell; and
a second shell disposed within the first shell to define a second space between the first and second shells, wherein the reservoir comprises the first and second shells, and the at least a portion of the evaporator is located in the second space.

9. The recirculating bath of claim 8, wherein the second shell includes a channel, and the second space is at least partially defined by the channel.

10. The recirculating bath of claim 1, further comprising:
a controller operatively coupled to the thermal element and the recirculating pump;
a human machine interface operatively coupled to the controller, the human machine interface configured to transmit instructions received from a user to the controller and display information received from the controller to the user; and
a housing configured to accommodate the reservoir, the thermal element, the recirculating pump, the controller, and the human machine interface, the housing including a top surface that provides access to the first space that is unobstructed by the thermal element, the recirculating pump, the controller, or the human machine interface.

11. The recirculating bath of claim 1, further comprising:
a controller configured to control operation of the recirculating bath; and a level sensor operatively coupled to the controller, the level sensor being located in the secondary chamber and providing a signal indicative of a level of the working liquid to the controller.

12. The recirculating bath of claim 1, further comprising:
a lid that provides access to at least a portion of the first space; and
a hinge having a latched state that pivotally couples the lid to the recirculating bath and an unlatched state that decouples the lid from the recirculating bath.

13. The recirculating bath of claim 12, further comprising:
a keeper coupled to the lid;
a post coupled to the recirculating bath; and
a selector coupled to the hinge and having a latched position and an unlatched position, the hinge comprising the keeper and the post.

14. The recirculating bath of claim 13, wherein the keeper includes a first guide hole, and the post includes a second guide hole, the recirculating bath further comprising:
a linkage coupled to the selector and including an end portion, the end portion being received by the first and second guide holes to couple the keeper to the post in response to the selector being in the latched position, and the end portion being withdrawn from at least one of the first and second guide holes to decouple the keeper and the post in response to the selector being in the unlatched position.

15. The recirculating bath of claim 13, wherein the keeper includes a cam, the selector being coupled to the cam so that the cam clamps to at least a portion of the post to couple the keeper to the post in response to the selector being in the latched position, and the cam unclamps from the at least a portion of the post to decouple the keeper and the post in response to the selector being in the unlatched position.

16. The recirculating bath of claim 12, wherein the lid has an open position and a closed position, the lid providing a working surface in the open position.

17. The recirculating bath of claim 16, wherein the lid includes a bottom surface and the working surface is provided by the bottom surface of the lid.

18. The recirculating bath of claim 16, further comprising:
a housing having a top surface,
wherein the lid includes a top surface that engages the top surface of the housing when the lid is in a fully open position so that the lid is held in place by contact between the top surface of the lid and the top surface of the housing.

19. The recirculating bath of claim 1, further comprising:
a manifold including an inlet configured to receive the working liquid from the recirculating pump, a first outlet configured to discharge the working liquid into the first space, and an elongated hollow body fluidically coupling the inlet to the first outlet.

20. The recirculating bath of claim 19 wherein the first outlet comprises:
a plurality of apertures in the hollow body, each aperture configured to discharge a portion of the working liquid received by the inlet into the first space.

21. The recirculating bath of claim 20 wherein the interior surface of the reservoir includes a bottom surface, the hollow body is elongated along an axis horizontal to the bottom surface, and the apertures are arranged in a line parallel to the axis.

22. The recirculating bath of claim 19 wherein the interior surface of the reservoir includes a second outlet fluidically coupled to the recirculating pump, and the manifold further comprises:
a flange that mechanically couples the manifold to the interior surface such that the inlet is aligned with and receives the working liquid from the second outlet.

23. The recirculating bath of claim 19, wherein, the manifold is located in the secondary chamber so that the working liquid is discharged into the secondary chamber.

* * * * *

UNITED STATES PATENT AND TRADEMARK OFFICE
CERTIFICATE OF CORRECTION

PATENT NO.         : 9,759,451 B2
APPLICATION NO.    : 14/489209
DATED              : September 12, 2017
INVENTOR(S)        : Dickinson et al.

It is certified that error appears in the above-identified patent and that said Letters Patent is hereby corrected as shown below:

In the Specification

In Column 5, Line 14, change "between the shells 40, 42 that enclose a thermal element," to --between the shells 40, 42 that encloses a thermal element,--.

In Column 14, Line 58, change "spirit or scope of applicants'" to --spirit or scope of Applicants'--.

In the Claims

In Claim 20, Column 16, Line 46, change "The recirculating bath of claim 19 wherein" to --The recirculating bath of claim 19, wherein--.

In Claim 21, Column 16, Line 51, change "The recirculating bath of claim 20 wherein" to --The recirculating bath of claim 20, wherein--.

In Claim 22, Column 16, Line 56, change "The recirculating bath of claim 19 wherein" to --The recirculating bath of claim 19, wherein--.

In Claim 23, Column 16, Line 63, change "The recirculating bath of claim 19, wherein," to --The recirculating bath of claim 19, wherein--.

Signed and Sealed this
Ninth Day of January, 2018

Joseph Matal
*Performing the Functions and Duties of the
Under Secretary of Commerce for Intellectual Property and
Director of the United States Patent and Trademark Office*